United States Patent
Tash

(10) Patent No.: US 7,036,138 B1
(45) Date of Patent: Apr. 25, 2006

(54) METHOD AND APPARATUS FOR SCHEDULING BROADCAST INFORMATION

(75) Inventor: Jonathan K. Tash, Menlo Park, CA (US)

(73) Assignee: Digeo, Inc., Kirkland, WA (US)

( * ) Notice: Subject to any disclaimer, the term of this patent is extended or adjusted under 35 U.S.C. 154(b) by 1043 days.

(21) Appl. No.: 09/709,004

(22) Filed: Nov. 8, 2000

(51) Int. Cl.
*H04N 5/445* (2006.01)
*H04N 7/173* (2006.01)
*G06F 3/00* (2006.01)
*G06F 13/00* (2006.01)

(52) U.S. Cl. .............. 725/46; 725/97; 725/52
(58) Field of Classification Search ............. 725/39, 725/46, 52–54, 109, 136, 139, 9, 28–29, 725/32, 97; 707/3, 10; 709/203, 205, 217–220
See application file for complete search history.

(56) References Cited

U.S. PATENT DOCUMENTS

| | | | |
|---|---|---|---|
| 5,115,436 A | 5/1992 | McAuley | 371/37.1 |
| 5,659,790 A | 8/1997 | Kim et al. | 395/806 |
| 5,715,262 A | 2/1998 | Gupta | 371/37.1 |
| 5,754,841 A * | 5/1998 | Carino, Jr. | 707/3 |
| 5,778,187 A | 7/1998 | Monteiro et al. | 395/200 |
| 5,793,747 A | 8/1998 | Kline | 370/230 |
| 5,812,545 A | 9/1998 | Liebowitz et al. | 370/337 |
| 5,864,557 A | 1/1999 | Lyons | 370/444 |
| 5,870,412 A | 2/1999 | Schuster et al. | 371/37.01 |
| 5,926,459 A | 7/1999 | Lyles et al. | 370/230 |
| 5,930,248 A | 7/1999 | Langlet et al. | 370/347 |
| 5,974,583 A | 10/1999 | Joo | 714/784 |
| 5,983,005 A | 11/1999 | Monteiro et al. | 395/200.61 |
| 6,000,053 A | 12/1999 | Levine et al. | 714/766 |
| 6,002,687 A | 12/1999 | Magee et al. | 370/394 |
| 6,031,875 A | 2/2000 | Im | 375/262 |
| 6,041,431 A | 3/2000 | Goldstein | 714/784 |
| 6,047,395 A | 4/2000 | Zook | 714/756 |
| 6,658,661 B1 * | 12/2003 | Arsenault et al. | 725/54 |
| 6,671,882 B1 * | 12/2003 | Murphy et al. | 725/54 |
| 6,728,713 B1 * | 4/2004 | Beach et al. | 707/10 |
| 6,742,184 B1 * | 5/2004 | Finseth et al. | 725/52 |
| 2002/0104099 A1 * | 8/2002 | Novak | 725/136 |

OTHER PUBLICATIONS

Brad Cain et al., "Generic Multicast Transport Services: Router Support for Multicast Applications", CMPSCI Technical Report TR 99-74, Oct. 1999, 15 pages.

Dan Rubenstein et al., "A Centralized, Tree-Based Approach to Network Repair Service for Multicast Streaming Media", AT&T Technical Memorandum TM HA1720000-991129-03, Nov. 1999, 20 pages.

(Continued)

*Primary Examiner*—Hai Tran
(74) *Attorney, Agent, or Firm*—Kory D. Christensen; Stoel Rives LLP

(57) ABSTRACT

Methods and apparatus are disclosed for efficiently scheduling incoming information objects so that timely objects from a variety of content classes are scheduled for broadcast. The incoming information objects are preferably received from one or more information sources, and are tagged with attributes that associate each object with one or more classes of information (e.g., sports, news, etc.), and provide a gauge of the timeliness or 'age' of the object. The tags can be used to select and broadcast objects from a variety of classes, and to identify the most timely objects at any give time.

40 Claims, 29 Drawing Sheets

OTHER PUBLICATIONS

Dan Rubenstein et al., "Improving Reliable Multicast Using Active parity Encoding Services (APES)", Technical Report 98-79, University of Massachusetts at Amberst, Department of Computer Science, Jul. 1998, 22 pages.

Dan Rubenstein et al., "Real-Time Reliable Multicast Using Proactive Forward Error Correction", Computer Science Department, University of Massachusetts at Amherst, dated prior to Nov. 8, 2000, 15 pages.

Dan Rubenstein et al., Real-Time Reliable Multicast Using Proactive Forward Error Correction (FEC), University of Massachusetts at Amherst, dated prior to Nov. 8, 2000, 14 slides.

Dan Rubenstein et al., "The Impact of Multicast Layering on Network Fairness", Technical Report 99-08, Department of Computer Science, Feb. 1999, 27 pages.

Dan Rubenstein et al., "Improving Reliable Multicast Using Active Parity Encoding Serivces (APES)", University of Massachusetts at Amherst, dated prior to Nov. 8, 2000, 14 slides.

Dan Rubenstein, "Increasing the Functionality and Availability of Reed-Solomon FEC Codes: a Performance Study", Technical Report 98-31, Department of Computer Science, Aug. 1998, 18 pages.

Johannes Blomer et al., "An XOR-Based Erasure-Resilient Coding Scheme", dated prior to Nov. 8, 2000, 19 pages.

John W. Byers et al., "A Digital Fountain Approach to Reliable Distribution of Bulk Data", TR-98-013, dated prior to Nov. 8, 2000, 23 pages.

Jorg Nonnenmacher et al., "Parity-Based Loss Recovery for Reliable Multicast Transmission", *Technical Report 97-17*, Department of Computer Science, University of Massachusetts, Mar. 1997, 21 pages.

Lixin Gao et al., "Supplying Instantaneous Video-On-Demand Services Using Controlled Multicast", dated prior to Nov. 8, 2000, 21 pages.

Luigi Rizzo et al., "A Reliable Multicast Data Distribution Protocol Based on Software FEC Techniques", dated prior to Nov. 8, 2000, 10 pages.

Luigi Rizzo, "Effective Erasure Codes for Reliable Computer Communication Protocols", dated prior to Nov. 8, 2000, 13 pages.

Luigi Rizzo, "On the feasibility of Software FEC", available at http://www.iet.unipi.it/~luigi/softfec.ps, dated prior to Nov. 8, 2000, 16 pages.

Maya Yajnik et al., "Measurement and Modelling of the Temporal Dependence in Packet Loss", UMASS COMPSCI Technical Report #98-78, dated prior to Nov. 8, 2000, 22 pages.

Michael G. Luby et al., "Analysis of Random Processes Via An-Or Tree Evaluation", TR-97-042 dated prior to Nov. 8, 2000, 16 pages.

Michael Luby et al., "Practical Loss-Resilent Codes", dated prior to Nov. 8, 2000, 20 pages.

Sneha Kumar Kasera et al., "A Comparison of Server-Based and Receiver-Based Local Recovery Approaches for Scalable Reliable Multicast", CMPSCI Technical Report TR 97-69, Dec. 1997.

Subhabrata Sen et al., "Frame-based Periodic Broadcast and Fundamental Resource Tradeoffs", Technical Report 99-78 Department of Computer Science, dated prior to Nov. 8, 2000, 23 pages.

Subhabrata Sen et al., "Optimal Patching Schemes for Efficient Multimedia Streaming", UMASS CMPSCI Technical Report 99-22, dated prior to Nov. 8, 2000, 16 pages.

* cited by examiner $$V_k = (Importance_k) * (f(AGE_k)) * (R_k(AGE_k))$$

$$Utility_{schedule} = \sum_{\text{All Classes "i"}} \left[ ClassImportance_i * \left[ \frac{\sum\limits_{\substack{\text{All Class Members} \\ \text{"k" of Class "i"}}} V_k}{N} \right] \right]$$

FIG. 12

$$Utility_{schedule} = \sum_{\text{All Classes "i"}} \left[ \sqrt{ClassImportance_i * \sum_{\substack{\text{All Class Members} \\ \text{"k" of Class "i"}}} V_k} \right]$$

FIG. 13

$$V_k = (Importance_k) * \frac{L_k(t)}{L\max_k}$$

FIG. 14

$$L_k(t) = \int_{current\ time=t}^{\infty} (f_k(t')) * (R_k(t'))\ dt'$$

FIG. 15

$$L\max_k = \int_{time\ created}^{\infty} (f_k(t')) * (R_k(t'))\ dt'$$

FIG. 16

$$EIV_k = \sum_{\text{All Classes "i"}} \left[ ClassImportance_i \left( \sqrt{\sum_{\substack{\text{All Members "o"} \\ \text{of Class "i"}}} V\_o} - \sqrt{\sum_{\substack{\text{All Members "o" of} \\ \text{Class "i" Except Object "k"}}} V\_o} \right) \right]$$

FIG. 17

$$Utility_{schedule} = \sum_{\text{All Objects "k"}} \left[ EIV_k \, e^{-\alpha t} \right]$$

FIG. 18

$$PriorityScore_k = \frac{d}{dt} \left[ \frac{EIV_k \, e^{-\alpha t}}{ObjectSize_k} \right]$$

FIG. 19

METHOD AND APPARATUS FOR SCHEDULING BROADCAST INFORMATION

CROSS REFERENCE TO CO-PENDING APPLICATIONS

This application is related to U.S. patent application Ser. No. 09/293,594 filed Apr. 16, 1999, entitled "A Broadband Data Broadcast Service", U.S. patent application Ser. No. 09/709,005, filed Nov. 8, 2000, entitled "Error Correction with Limited Working Store", U.S. patent application Ser. No. 09/571,791, filed May 16, 2000, entitled "Maintaining Information Variety in an Information Receiving System", which are all assigned to the assignee of the present invention and are all incorporated herein by reference.

BACKGROUND OF THE INVENTION

The present invention relates to mechanisms for scheduling broadcast information, and more particularly, to mechanisms for maintaining variety and/or timeliness of the information in a scheduled broadcast stream.

Information systems allow a wide variety of information to be transmitted to individual consumers of information. A typical information system includes an information transmitter and one or more information receiver systems. The information receiver systems receive the information transmitted by the information transmitter, and provide the information to the consumer. Such an information system may be based on over-the-air transmissions, satellite transmissions, wire-based transmissions including cable, fiber-optic transmissions, or any other type of information transmission medium.

For most systems, there is a large amount of information that is available for broadcast. The information may take the form of news stories, entertainment programming, software, etc. Each of these general categories of information often have multiple sub-categories. For example, news stories may have local, national and international sub-categories, each covering a wide variety of topical categories such as sports, business, recreation, etc. Each topical category may have further sub-categories. For example, the sports topical category may have sub-categories of baseball, football, soccer, hockey, etc. As can be seen, there can be a wide variety of information that is available for broadcast.

Compounding the amount of information that is available for broadcast is the element of time. New information is always becoming available. Thus, the mere passage of time tends to multiply the amount of information that is available for broadcast. Some information may be more relevant if it is timely and fresh. For example, the score a hockey game may be much more relevant just after the game than it is even a few days later.

Because information systems have a limited bandwidth, all of the available information cannot be broadcast. Thus, some selection must be made with regard to the available information. For conventional broadcast mediums, such as television, this selection is typically done by an editorial staff or the like, which identifies and selects what it believes to be timely information that covers a variety of topics of interest to its viewers. A limitation of such an approach is that a human editorial staff can be expensive to maintain. Further, the editorial staff may not be able to operate in real time, and may become easily overloaded, particularly when information from a variety of sources covering a wide variety of topics must be constantly considered for broadcast. Thus, the editorial staff may miss or delay important information that is highly relevant to the consumers of the information. What would be desirable, therefore, is a more automated approach for identifying and scheduling information for broadcast.

SUMMARY OF THE INVENTION

The present invention overcomes many of the disadvantages of the prior art by providing methods and apparatus for efficiently scheduling incoming information objects so that the objects scheduled for broadcast are from a variety of information topics or classes and/or are timely. The incoming information objects are preferably received from one or more information sources, and are tagged with attributes that associate each object with one or more classes of information (e.g. sports, news, etc), and provide a gauge of the timeliness or 'age' of the object. The tags can be used to select and broadcast objects from a variety of classes, and to identify the most timely objects at any give time.

In one illustrative embodiment, the incoming objects are received from a variety of sources, and certain objects are inserted into an object schedule. When an object is to be broadcast, the object at the top of the schedule is broadcast first. Thus, the ordering of the objects within the object schedule may be important. Generally speaking, objects that contribute more to the overall utility of the object schedule are positioned near the top of the object schedule.

It is contemplated that each object may have a pre-assigned importance factor. The importance factor may identify the importance of the object relative to other objects. The importance factor may be used to identify which objects should be added to the object schedule and which objects should be evicted, and also may be used to determine the optimum order of objects in the object schedule. All else being equal, an object with a higher importance factor should be positioned higher in the object schedule than an object with a lower importance factor. As new objects are received, the objects with the lowest importance factors may be evicted from the object schedule.

To identify the most timely objects at any give time, a timeliness factor may be provided for each object. The timeliness factor is related to the expected age of an object when broadcast. Each object may have a time indicator tag. The expected age of an object can be calculated by determining the difference in time between the time indicator tag and the estimated broadcast time of the object. Preferably, the timeliness factor incorporates a function that decreases with the "age" of the object.

To determine more accurately the expected "age" of an object, a current channel bandwidth may be estimated by monitoring the number of bytes that were recently transmitted over a predetermined period of time. Using the size and position of each of the objects in the object schedule and the estimated channel bandwidth, an estimated time for delivery for each object can be determined. The estimated time for delivery can then be compared to the time indicator for each object in the object schedule to determine the expected "age" of the object when broadcast. Since the timeliness factor of each object preferably decreases with the "age" of the object, the timeliness factor will be dependent on the position of the object within the schedule.

It is contemplated that the timeliness factor of an object may also include a measure of the objects freshness. The freshness of an object preferably diminishes with time from the time of broadcast, rather than the expected age of the object when broadcast as discussed above. Object freshness can be used to help further optimize the ordering of the objects in the object schedule. It is recognized that some objects may have a timeliness factor but not a freshness factor, such as movie listing.

The importance factor and timeliness factors may be used together to determine whether an object should be moved, added or evicted from the object schedule. In one illustrative embodiment, the importance factor is multiplied by the timeliness factor to determine an object utility factor for each object. In this embodiment, the utility factors are higher for those objects that are more timely, assuming the same importance factor. To optimize the order of the objects in the object schedule, the object utility factors for all objects in the object schedule may be combined to provide an overall schedule utility factor. The position of the objects in the object schedule may then be manipulated to maximize the overall schedule utility factor. For a preferred application, maximizing the overall schedule utility factor corresponds to maximizing the utility of the objects by the receiver. Object freshness may or may not be incorporated into the schedule optimization routine.

To maintain a variety of objects in the object schedule, a class utility factor may be maintained for each class of objects. Each class utility factor may be calculated by, for example, combining the object utility factors for the objects in the object schedule that are members of the class. Preferably, the object utility factors for those objects that are in a class are combined using a sub-linear function so that additional objects in a class produce diminishing returns. An overall schedule utility factor may be calculated by combining the class utility factors for all classes.

When a new object arrives, the overall schedule utility factor may be updated. If the overall schedule utility factor increases, then the new object is added (and another discarded, if necessary), and if the overall schedule utility factor decreases, the new object may be discarded outright. It is contemplated that each class may have a class importance factor. Those classes that have a higher class importance factor will naturally have more objects or consume more space in the object schedule than those classes with a lower class importance factor.

For a variety of reasons, it is often desirable to interleave packets or symbols from several scheduled objects during transmission. One reason for this is that interleaving tends to spread the errors of error bursts in the transmission channel across several objects, which may be more acceptable than having many errors in one object.

One illustrative method for interleaving packets or symbols of several objects is to maintain a transmit time variable for each object. The transmit time variable may be initialized to a predetermined value, such as a current time. A timer value may also be maintained. To determine which object to transmit a packet from, a score may be calculated for each object, wherein the score is dependent on the difference between the transmit time variable for each object and the current timer value. The object with the highest score is selected, and one or more packets from the object are transmitted across the transmission channel. Once the packets are transmitted, the transmit time for the selected object is set to the current timer value. By setting the transmit time for the selected object to the current timer value, the score of that object is reduced. Thus, during the next transmission cycle, it is likely that a packet from another one of the objects will be selected for transmission. For some applications, it may be desirable to provide selected objects with different transfer rates. For example, CNN may wish to have its information objects transmitted at some guaranteed transfer rate. To accomplish this, the score of each object may be made dependent on a specified transfer rate.

Once the last packet of an object has been successfully transmitted, the object is removed. When the available bandwidth exceeds the number of objects that are queued for transmission, a new object is retrieved. The transmit time for the new object is preferably set to the current time, and the process is allowed to continue.

Another illustrative method for interleaving packets or symbols of several object is to maintain a "next transit time" variable for each object. The "next transit time" variable may be initialized to a predetermined value, such as the current time. Each time a packet is sent from an object, the "next transit time" variable for the object is incremented by, for example, 1/(packet transfer rate). During each transmission cycle, a packet is selected from the object with the lowest "next transit time" value. This method has the advantage of keeping track of delays that might accumulate due to bandwidth variations, tiebreaker policies, etc.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 12 is a diagram showing another illustrative method for calculating an overall schedule utility factor for the object schedule of FIG. 4;

FIG. 13 is a diagram showing yet another illustrative method for calculating an overall schedule utility factor for the object schedule of FIG. 4;

FIG. 14 is a diagram showing another illustrative method for calculating a utility factor for an object;

FIG. 15 is a diagram showing an illustrative Lifetime L(t) function that may be used in FIG. 14;

FIG. 16 is a diagram showing a maximum lifetime Lmax function that may be used in FIG. 14;

FIG. 17 is a diagram showing an illustrative method for calculating an incremental utility factor for each object in the object schedule;

FIG. 18 is a diagram showing an illustrative method for calculating an overall schedule utility factor for the object schedule using the incremental utility factors of FIG. 17;

FIG. 19 is a diagram showing an illustrative method for calculating a priority score for each object in the object schedule using the incremental utility factors of FIG. 17;

DETAILED DESCRIPTION OF THE INVENTION

The detailed description that follows is presented largely in terms of algorithms and symbolic representations of operations on data bits within a computer or computer memory. These algorithmic descriptions and representations are the means used by those skilled in the data processing arts to most effectively convey the substance of their work to others skilled in the art.

An algorithm is here, generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, or otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities.

The present invention is preferably implemented for practice by a computer, programmed to control the operations therein. It is contemplated that a number of source code expressions, in one of many computer languages, can be used to implement the present invention. The present invention also relates to apparatus for performing these operations. This apparatus may be specially constructed for the required purposes, or may be a general purpose computer as selectively activated or reconfigured by a computer program stored in the computer. The algorithms presented herein are not inherently related to a particular computer system or other apparatus. In particular, various general-purpose computer systems may be used with computer programs written in accordance with the teachings of the present invention, or it may prove more convenient to construct more specialized apparatus to perform the recited method steps.

Figure 1:
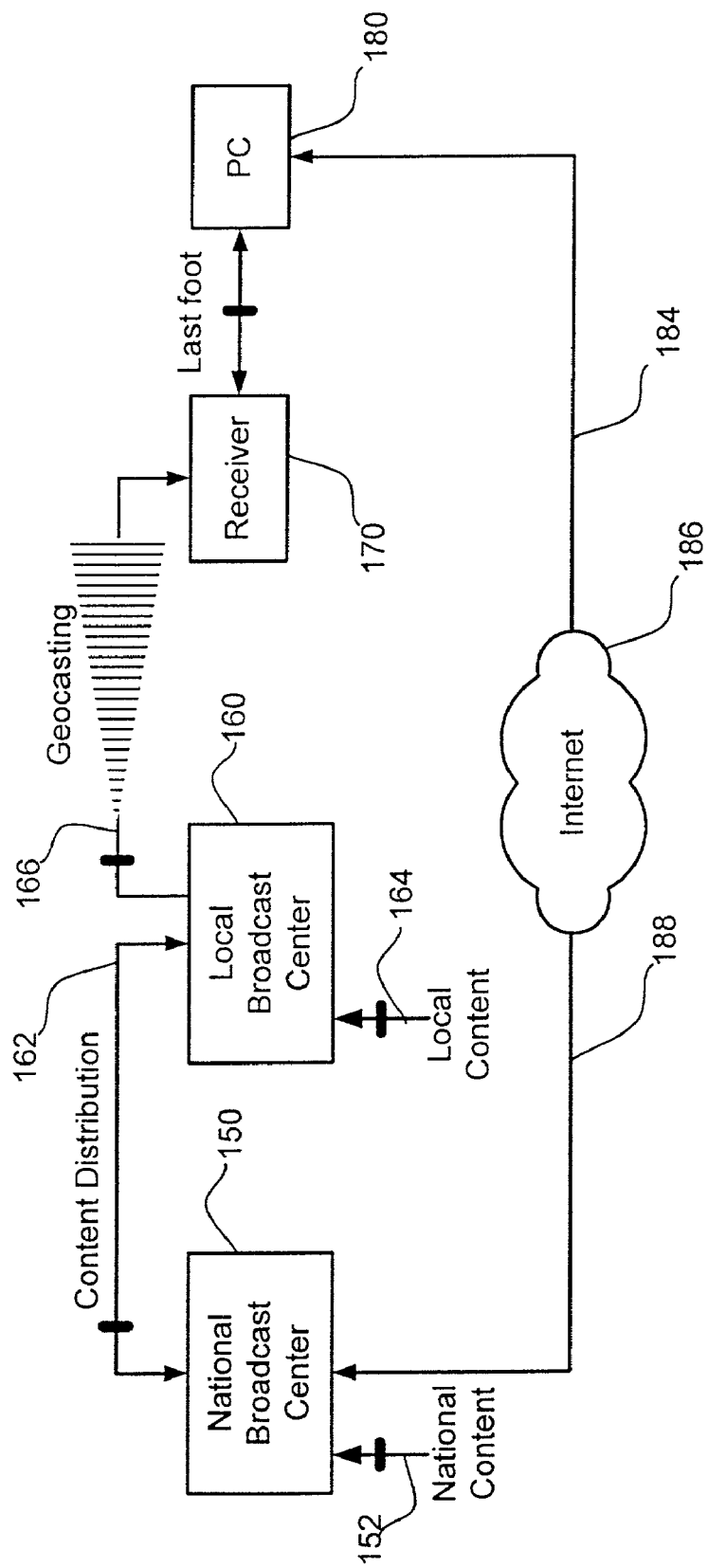
FIG. 1 is a block diagram of an illustrative broadband data broadcasting service that includes the present invention.

In an illustrative embodiment, and referring to FIG. 1, a national broadcast control center 150 is shown for receiving digital information from a number of different data origination sources via one or more national content channels 152. The data origination sources may be any entity that provides digital information for broadcast data over a data broadcast medium. For example one type of entity that may provide digital information for broadcast data over a data broadcast medium may be a broadcast news studio that creates audio and/or video news segments. The audio and/or video news segments may be digitized before or after transmission to the national broadcast center 150.

The national broadcast center 150 processes the incoming digital information stream from the various data origination sources by adding addressing information, stream descriptor information, and error correction coding (ECC). Other stream processing operations may be performed such as encryption of the information streams. The national broadcast center 150 then multiplexes the received digital information streams from the various data origination sources to provide a single national broadcast stream.

After processing the individual digital information streams and multiplexing the individual digital information streams into a single national broadcast stream, the national broadcast center 150 modulates the multiplexed digital information stream onto a national digital broadcast signal. The national broadcast center 150 then transmits the national digital broadcast signal on a broadcast distribution medium. In one embodiment, a satellite wireless broadcast system is used to broadcast the digital broadcast signal to a large number of receiving sites, such as local broadcast center 160. It is contemplated, however, that any type of broadcast media can be used such as digital broadcast television signals, cable television signals, radio frequency broadcasts, direct video broadcast terrestrial signals, or any other suitable broadcast medium.

The local broadcast center 160 receives the national digital broadcast signal via national broadcast distribution medium 162. The local broadcast center 160 demodulates the national digital broadcast signal to retrieve the multiplexed digital information stream. The local broadcast center 160 may also receive locally generated broadcast content via one or more local channels 164. The local content sources may include, for example, additional data broadcast formatted content with local advertisers and local news teams created by local digital television broadcast stations. Once received, the local broadcast center 160 may add addressing information, stream descriptor information, and error correction coding (ECC). Other stream processing operations may also be performed, such as encryption of the information streams.

The local broadcast center 160 then multiplexes the locally generated data broadcast content with the national digital information stream, to provide a local broadcast digital information stream. The local broadcast center 160 may then modulate the multiplexed local broadcast digital information stream into a local digital broadcast signal 166. The local broadcast center 160 transmits the local broadcast digital signal 166 on a broadcast distribution medium, such as a terrestrial wireless broadcast system, a digital broadcast television signal, a cable television signal, a radio frequency broadcast, a direct video broadcast satellite signal, or any other suitable broadcast medium.

A receiver system 170 receives the local broadcast signal from the local broadcast center 160. The receiver system 170 may then present the information to a user, preferably through an appliance such as a personal computer that is connected to the receiver system 170.

To provide selectivity, the receiver system 170 may examine the address portions of the data packets and/or stream descriptor portions of each digital information stream to determine if the user of the receiver system 170 is interested in the particular digital information stream. The user of the receiver system 170 may be interested in a particular digital information stream if that digital information stream matches a set of preprogrammed interest parameters or preferences defined by the user and programmed into the receiver system 170. The receiver system 170 may cache the matching digital information streams and/or directly output the matching digital information streams to the user's system 180.

A back channel 184 may be provided from the user's system 180 (or from the receiver system 170) to the internet 186. The back channel 184 may connect to, for example, the national broadcast center 150 as shown at 188, the local broadcast center 160, or any other site on the internet. Although not required, the back channel 184 may provide a feedback mechanism from the user's system 180 to the broadcasting centers, a control center, vendor sites, etc. Additional information on the above-illustrative broadband data broadcasting service is available in co-pending U.S. patent application Ser. No. 09/293,594, entitled "A Broadband Data Broadcasting Service", which is incorporated herein by reference.

Figure 2:
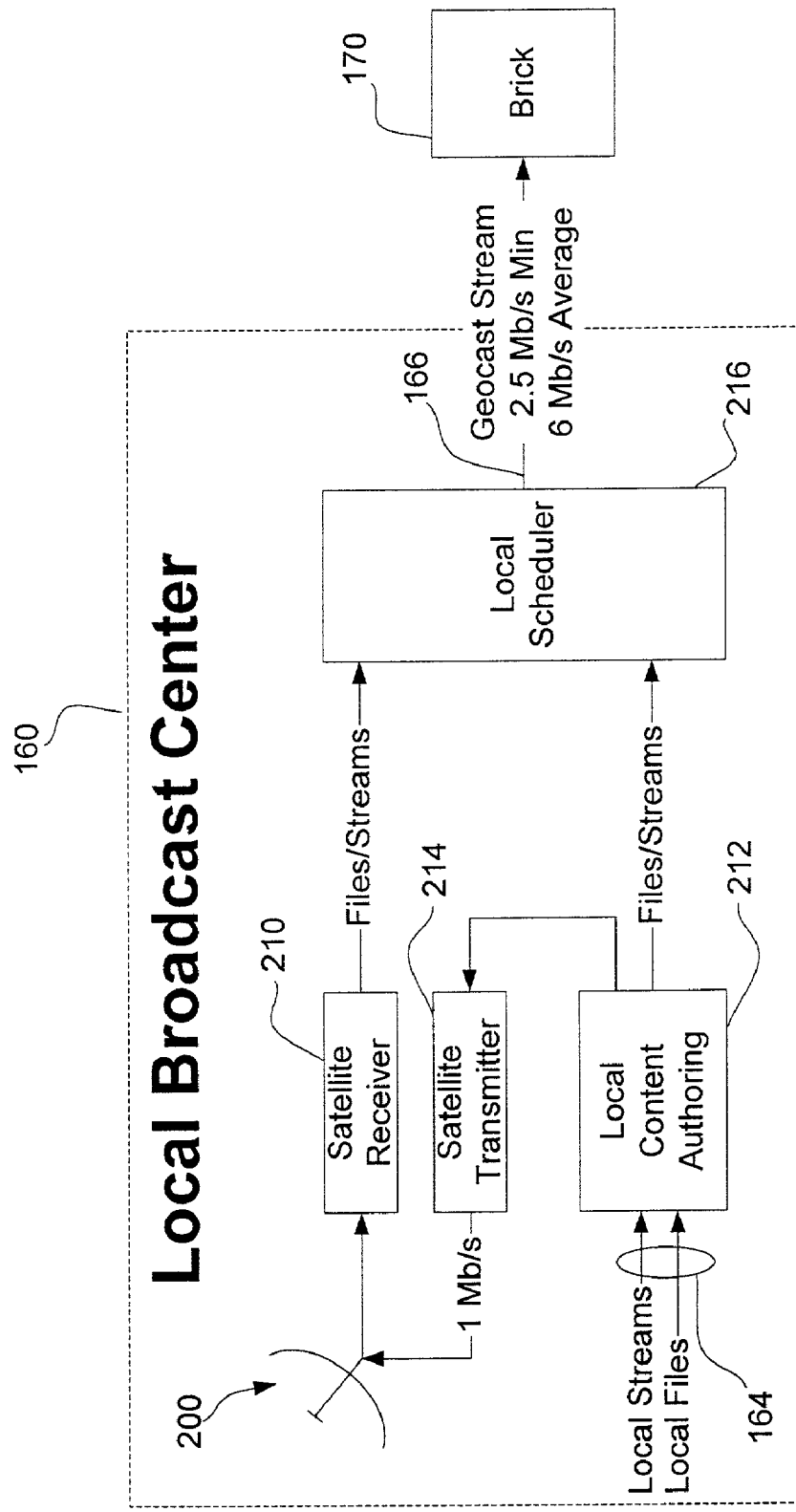
FIG. 2 is an illustrative block diagram of the local broadcasting center of FIG. 1.

FIG. 2 is a block diagram of an illustrative local broadcasting center 160. As indicated above, the local broadcast center 160 receives the national digital broadcast signal via broadcast distribution medium 162. In the embodiment shown, the local broadcasting center 160 receives the national digital broadcast signal via a satellite broadcast digital television antenna 200. However, and as indicated above, it is contemplated that the broadcast distribution medium 162 may be any type of broadcast medium. For example, the antenna 200 may be a Ku band satellite antenna, a connection to a cable television based digital signal distribution system, or any other appropriate system for receiving the broadcast signals.

The national digital broadcast signal is provided to a receiver front-end system 210 that includes receiver circuitry for demodulating the national digital broadcast signal to retrieve the multiplexed digital information stream. The local broadcast center 160 may also receive locally generated broadcast content via one or more local channels 164. Once received, a local content authoring block 212 may add addressing information, stream descriptor information, and error correction coding (ECC). Other stream processing operations may also be performed, such as encryption of the information streams. The local content authoring block 212 may then provide some or all of the locally generated data broadcast content to a transmitter system 214 for transmission to other local broadcast centers or to the national broadcast center 150 for distribution to other markets.

The local content authoring block 212 may also provide the locally generated data broadcast content to a scheduler block 216. Scheduler block 216 may multiplex the locally generated data broadcast content with the national digital information stream, to provide a local broadcast digital information stream. Because the volume of content provided by the national broadcast center 150 and the local content channels 164 may be more than can be broadcast on the local digital broadcast signal 210, the local scheduler 216 provides some level of selectivity for selecting and scheduling digital content so that a wide variety of up-to-date content is provided. The remaining content may be provided to a garbage queue.

The local broadcast center 160, and in the embodiment shown, the local scheduler 216, modulates the multiplexed local broadcast digital information stream into a local digital broadcast signal 166. The local digital broadcast signal 166 is then transmitted via a broadcast distribution medium to a receiver system 170, as described above.

Figure 3:
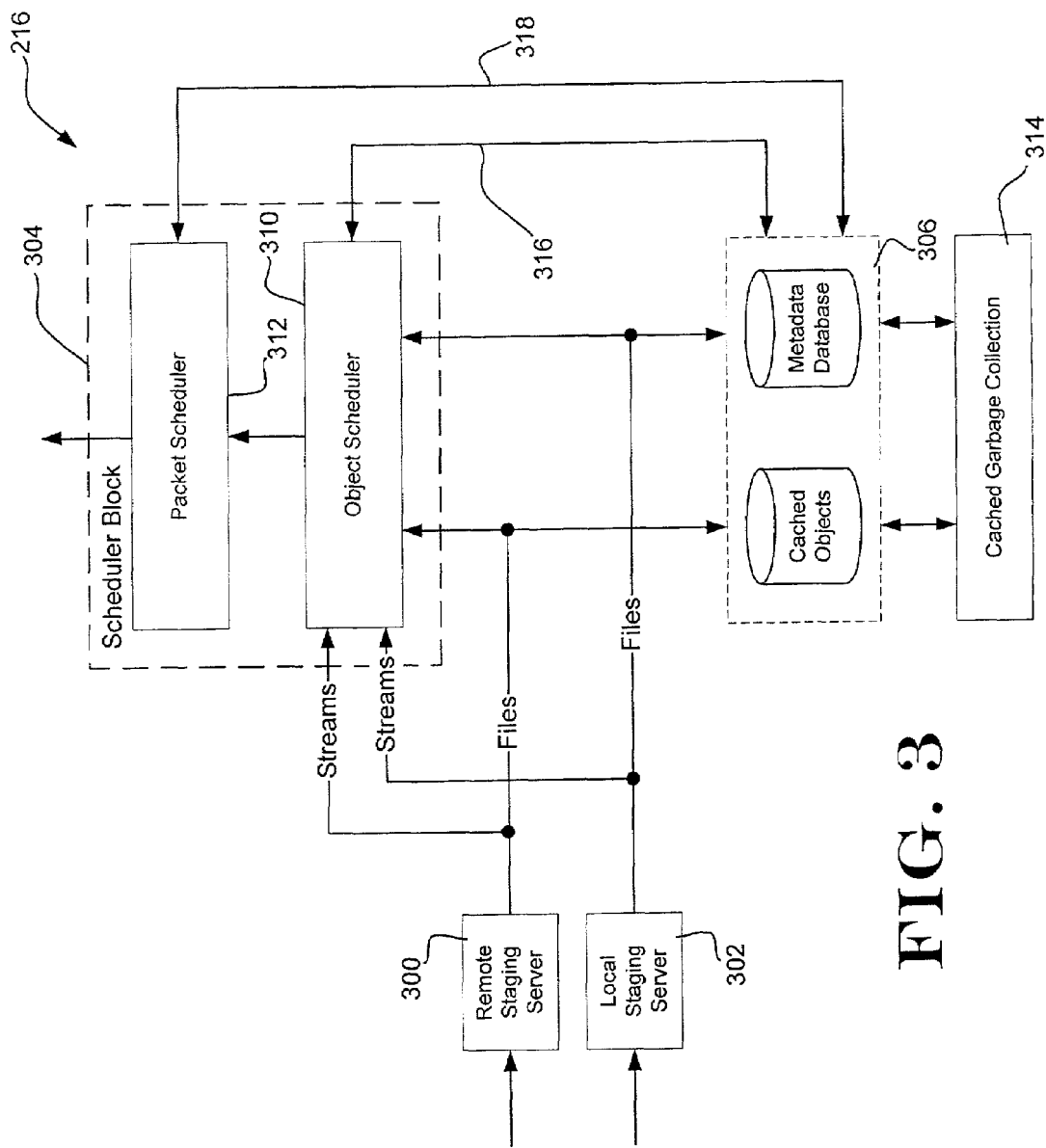
FIG. 3 is an illustrative block diagram of the local scheduler 216 of FIG. 2.

FIG. 3 is an illustrative block diagram of the local scheduler block 216 of FIG. 2. The illustrative local scheduler 216 includes a remote staging server 300 for receiving object files and streams from the national content stream, and a local staging server 302 for receiving object files and streams from the local content stream. The remote staging server 300 and the local staging server 302 stage the object files and streams before providing them to the object cache 306 and/or scheduler block 304. The object streams, which are to be broadcast in real time, are passed through to the output of the scheduler block 304, while the object files are provided to the object cache 306. The scheduler block 304 preferably receives the estimated remaining bandwidth as its quota, but otherwise knows little if anything about the object streams.

The object cache 306 stores both the object itself and corresponding object meta-data. Each incoming object preferably includes a set of meta-data that describes the incoming object in terms of, among other things, a set of content properties. Examples of content properties include subject, author, content category, timeliness, importance, content ratings such as for movies, and content type, to name only a few examples.

The scheduler block 304 uses the meta-data to help schedule the objects. In the diagram shown, the scheduler block 304 includes an object scheduler 310 and a packet scheduler 312. The object scheduler 310 receives the meta-data from the incoming object and, using the meta-data, schedules the objects so that a variety of timely information is scheduled for broadcast. The objects may be scheduled using pointers or the like that identify the corresponding object in the object cache 306. Once the objects are identified, the object scheduler 310 notifies the packet scheduler 312 which objects to transmit. The packet scheduler 312 schedules the packets of the identified objects for transmission.

Because the object cache 306 has a relatively large but limited storage capacity, the object scheduler 310 must decide whether to: (1) place an incoming object in the object cache 306, and if the object cache 306 is full, evict one or more of the objects already in the object cache 306; or (2) reject the incoming object outright. If the object cache 306 is not full, the object scheduler 310 typically accepts and places the incoming object in the object cache 306. If the object cache 306 is already full, the object scheduler 310 typically replaces one or more of the objects in the object cache 306 only if the utility of the incoming object is greater than the utility of the evicted object(s). The utility of an object may be related to the variety that object will provide to the schedule and/or the timeliness of the object, among other things.

When an object is evicted from the object cache 306, the object is provided to the cached garbage collection block 314. The cached garbage collection block 314 designates those objects that are dropped from consideration for broadcast. The object scheduler 310 controls which objects are evicted from the object cache 306 via control lines 316.

As indicated above, the object streams provided by remote staging server 300 and local staging server 302 may by-pass the object schedule in the object scheduler block 310, and proceed directly to the packet scheduler 312. When an object stream is present, the object scheduler 310 may still schedule objects for transmission during any breaks or openings in the object stream.

It is contemplated that the object scheduler 310 may rebroadcast previously broadcast objects, if desired. The previously broadcast objects preferably have a penalty factor that decreases with time. Thus, immediately after an object is broadcast, the penalty factor reduces the value of the object in the object schedule 310. Since the penalty factor decreases with time, the value of the object in the object schedule increases with time. Re-broadcasting objects may allow users to gain access to objects that were, for example, broadcast initially when the user's receiver was turned off, or when the user changes preferences that now provide a bias toward the previously broadcast object.

The packet scheduler 312 schedules packets for transmission to the receiver system 170 of FIG. 2. Each object has one or more data packets. For a variety of reasons, it is often desirable to interleave packets from several scheduled objects during transmission. One reason for this is that interleaving tends to spread error bursts in the transmission channel across several objects, which may be more acceptable than having many errors in one object.

In one illustrative embodiment, and to achieve interleaving, the packet scheduler 312 maintains a timer value indicative of a current time. The packet scheduler 312 also maintains a transmit time variable for each object in the output queue. Initially, the transmit time variable for all objects is initialized to a predetermined value such as the current time.

To determine which object to select a packet from, the packet scheduler 312 calculates a score for each object. The score of an object is preferably dependent on the difference between the transmit time variable of the object and the current timer value. The object with the highest score is selected, and one or more packets from the selected object are transmitted across the transmission channel.

Once one or more packets have been successfully transmitted, the transmit time for the selected object is set to the current time value. By setting the transmit time for the selected object to the current time value, the score of that object is reduced, preferably to zero. Thus, during the next transmission cycle, it is likely that a packet from a different one of the objects in the output queue will be selected for transmission.

For some applications, it is desirable to provide objects that have different transfer rates. For example, CNN may wish to have its information objects transmitted at some guaranteed higher transfer rate. To accomplish this, the packet scheduler 312 may incorporate a designated transfer rate into the score calculation. That is, those objects with a higher transfer rate will tend to have a higher score, everything else being equal. This translates into a higher transfer rate for those objects while still achieving a level of interleaving.

In another illustrative embodiment, the packet scheduler 312 maintains a "next transit time" variable for each object. Initially, the "next transit time" variable for all objects is initialized to a predetermined value such as the current time. Each time a packet is sent from an object, the packet scheduler 312 increments the "next transit time" variable for that object by, for example, 1/(packet transfer rate). During each transmission cycle, the packet scheduler 312 selects a packet from the object with the lowest "next transit time" value. This method has the advantage of keeping track of delays that might accumulate due to bandwidth variations, tiebreaker policies, etc.

When the bandwidth exceeds the number of objects in the packet scheduler, the packet scheduler 312 requests another object from the object scheduler 310. In response, the object scheduler 310 provides a pointer to the current highest priority object in the object cache 306. The packet scheduler 312 then reads up the designated object from the object cache 306 via interface 318.

Figure 4:
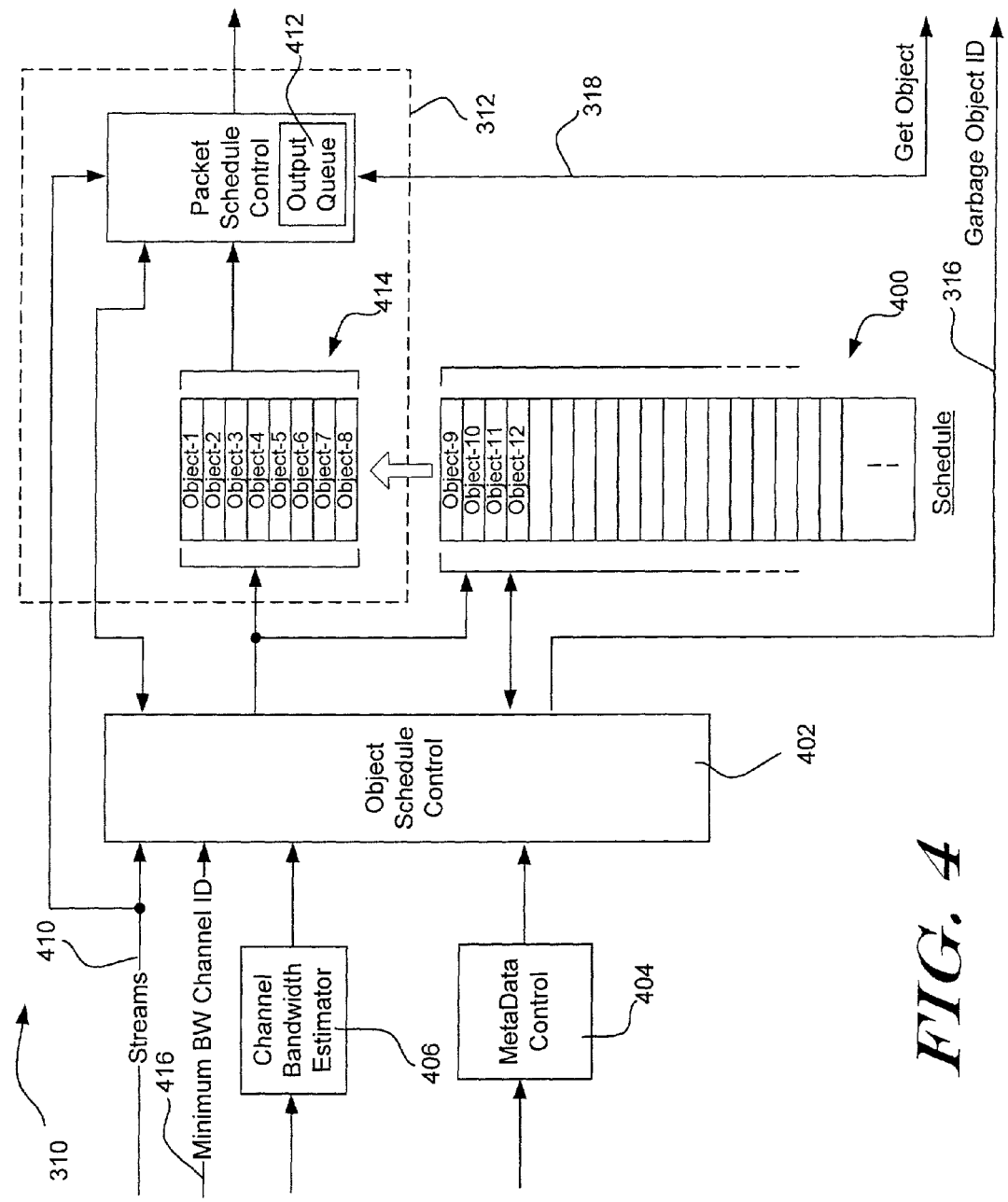
FIG. 4 is an illustrative block diagram of the object scheduler of FIG. 3.

FIG. 4 is an illustrative block diagram of the object scheduler block 310 of FIG. 3. The core of the object scheduler block 310 is an object schedule 400. The object schedule 400 preferably includes an ordered list of pointers, where each pointer points to an object stored in the object cache 306 of FIG. 3. Each pointer can be thought of as a scheduled object. The objects toward the top of the object schedule 400, such as "Object-9", typically have a higher priority than the objects toward the bottom of the object schedule 400. The priority of the objects can be determined in many ways, but preferably by using a utility factor that is provided or calculated for each object or the schedule as a whole.

Rather than keeping an ordered list of pointers, it is contemplated that a set of expected future times may be stored for the objects in the object schedule 400. The object scheduler block 310 may then track which objects to broadcast by examining the future times for each object in the object schedule 400. Using this approach, pointers need not be re-ordered, as described above. Instead, the objects can be selected for delivery by examining the future times. While this is a less detailed representation, is may be sufficient and easier to compute.

In another embodiment, each of the objects in the object schedule 400 are assigned to one of several groups. Each group corresponds to a time slot, and includes all of the objects that are scheduled for broadcast during that time slot. For example, a first group may correspond to a time slot that extends from the current time to the current time plus one hour. This group may thus include all objects in the object schedule 400 that are scheduled for broadcast in the next one hour. Another group may correspond to a time slot that extends from a current time plus one hour to the current time plus two hours. This group may include all objects in the object schedule 400 that are scheduled for broadcast in the second hour from the current time. The object scheduler block 310 may then optimize the schedule by assigning the objects to different groups. The order of the objects within a particular group may or may not be optimized. While this is a less detailed representation, is may be sufficient and easier to compute.

The object schedule 400 is controlled, at least in part, by an object schedule control block 402. The object schedule control block 402 receives the meta-data for an incoming object from meta-data control block 404, and determines if and where the object should be placed in the object schedule 400. This determination may be made by examining the utility factors for each of the objects in the object schedule 400 and the utility factor of the incoming object, as further described below.

In one embodiment, the meta-data is used by the object schedule control block 402 to determine the utility factor for each object. As described above, the meta-data may include several properties, including properties that relate to the importance, timeliness, and content class of the object.

The importance factor may identify the importance of the object relative to other objects. In a simple system, the importance factor may be used to identify which objects should be added to the object schedule 400 and which objects should be evicted, and also may be used to determine the optimum order of objects in the object schedule 400. All else being equal, an object having a higher importance factor should be positioned higher in the object schedule 400 than an object with a lower importance factor. As new objects with higher importance factors are received, the objects with the lowest importance factors may be evicted from the object schedule 400. When an object is evicted from the object schedule 400, the object schedule control 402 may send a garbage object ID 316 to the object cache 306 of FIG. 3, indicating that the object should be moved to the cached garbage collection block 314.

To identify the most timely objects at any give time, a timeliness factor may be calculated for each object. The timeliness factor may be related to the expected age of an object when broadcast. To determine a timeliness factor, each object may have a time indicator tag in its meta-data. The expected age of the object can be calculated by determining the difference in time between the time indicator tag and the estimated broadcast time of the object. Preferably, the timeliness factor is calculated using a function that decreases with the "age" of the object.

To determine more accurately the expected "age" of an object, a channel bandwidth estimator block 406 may be provided. The channel bandwidth estimator block 406 may estimate the current channel bandwidth by monitoring the number of bytes that were recently transmitted by packet scheduler 312 over a predetermined time period. Using the size and position of each of the objects in the object schedule 400 and the estimated channel bandwidth, an estimated time for delivery for each object can be determined. The estimated time for delivery can then be compared to the time indicator flag for each object in the object schedule to determine the expected "age" of the object when broadcast. Since the timeliness factor of each object preferably decreases with the "age" of the object, the timeliness factor will be dependent on the position of the object within the object schedule 400.

It is contemplated that the timeliness factor of an object may also include a measure of an objects freshness. The freshness of an object may diminish with time from the time of broadcast, rather than the expected age of the object as discussed above. Object freshness can be used to help further optimize the ordering of the objects in the object schedule 400. It is recognized that some objects may have a timeliness factor but not a freshness factor, such as movie listing.

The object schedule control block 402 may use both the importance factor and timeliness factors to determine whether an object should be moved, added or evicted from the object schedule 400. In one illustrative embodiment, the importance factor is multiplied by the timeliness factor to determine the object utility factor for each object. The timeliness factor may include the timeliness factor that is related to the age of the object, a freshness factor, or both, to determine the object utility factor for each object. In this embodiment, the utility factors are higher for those objects that are more timely, assuming the same importance factor. To optimize the order of the objects in the object schedule 400, the object schedule control block 402 may combine the object utility factors for all objects in the object schedule to provide an overall schedule utility factor. Object schedule control block 402 may then manipulate the position of the objects in the object schedule 400 to maximize the overall schedule utility factor.

To maintain a variety of objects in the object schedule 400, the object schedule control block 402 may maintain a class utility factor for each class of objects. Each class utility factor may be calculated by, for example, combining the object utility factors for all objects in the object schedule 400 that are members of the class. Preferably, the object utility factors are combined using a sub-linear function so that additional objects in a class produce diminishing returns. Then, an overall schedule utility factor may be calculated by combining the class utility factors for all classes.

When a new object arrives, the object schedule control block 402 may insert the new object into the object schedule 402 and update the overall schedule utility factor. If the overall schedule utility factor increases, then the new object is added to the object schedule 400 (and another is discarded, if necessary). If the overall schedule utility factor decreases, the new object may be discarded outright. It is contemplated that each class may have a class importance factor. Those classes that have a higher class importance factor will typically tend to consume more space in the object cache 306 than those classes with a lower class importance factor, primarily because those objects will tend to contribute higher values to the overall schedule utility factor.

As indicated above with respect to FIG. 3, the remote staging server 300 and local staging server 302 provide the object streams to the object scheduler 310. The object streams enter the object scheduler 310 via interface 410, and preferably by-pass the object schedule 400 and proceed directly to the packet scheduler 312, as shown. The object schedule control block 402 receives the estimated remaining bandwidth as its quota, but otherwise may know nothing about the object streams. When an object stream is present, the object schedule control block 402 may still schedule objects for transmission during any breaks or openings in the object stream.

The illustrative packet scheduler, generally shown at 312, schedules packets for transmission to the receiver system 170 of FIG. 2. The packet scheduler 312 preferably stores a number of objects in an output queue 412. In the illustrative embodiment, the output queue 412 stores the eight highest priority objects of the current object schedule 400. It must be recognized, however, that the number of objects in the packet scheduler 312 may depend on a number of factors including the object transfer rates, the total available bandwidth, the required meta-data lead times, etc. Thus, the number of objects in the packet scheduler 312 may vary. An upper bound may be provided, if desired.

The objects stored in the illustrative output queue 412 are identified by eight locations in the object scheduler 310, generally shown at 414. The object schedule control block 402 provides an object identifier from the top of the object schedule 400 to one of the eight locations 414 whenever the packet scheduler 312 requests another object for transmission. As indicated above, the object identifier provided by the object schedule 400 may be a pointer that identifies a corresponding object in the object cache 306. The packet scheduler 312 reads up the designated object from the object cache 306 to the output queue 412 via interface 318.

In one illustrative embodiment, and to achieve interleaving, the packet scheduler 312 may maintain a timer value indicative of a current time. The packet scheduler 312 may also maintain a transmit time variable for each object in the output queue. Initially, the transmit time variable for all objects is initialized to a predetermined value such as the current time.

To determine which object to select a packet from, the packet scheduler 312 may calculate a score for each object. The score of an object is preferably dependent on the difference between the transmit time variable of the object and the current timer value. The object with the highest score is selected, and one or more packets from the selected object are transmitted across the transmission channel.

Once one or more packets have been successfully transmitted, the transmit time for the selected object is set to the current time value. By setting the transmit time for the selected object to the current time value, the score of that object is reduced, preferably to zero. Thus, during the next transmission cycle, it is likely that is a packet from a different one of the objects in the output queue 412 will be selected for transmission.

When the available bandwidth exceeds the number of objects in the packet scheduler 312, the packet scheduler 312 requests another object from the object scheduler 310. In response, the object scheduler 310 provides an object identifier (e.g., pointer) to the current highest priority object in the object schedule 400. The packet scheduler 312 reads up the designated object from the object cache 306 to the output queue via interface 318, and the object scheduler 310 may remove the object from the object schedule.

In another illustrative embodiment, the packet scheduler 312 maintains a "next transit time" variable for each object. Initially, the "next transit time" variable for all objects is initialized to a predetermined value such as the current time. Each time a packet is sent from an object, the packet scheduler 312 increments the "next transit time" variable for that object by, for example, 1/(packet transfer rate). During the next transmission cycle, the packet scheduler 312 selects a packet from the object with the lowest "next transit time" value. This method has the advantage of keeping track of delays that might accumulate due to bandwidth variations, tiebreaker policies, etc.

It is contemplated that a minimum bandwidth channel ID 416 may be provided to the object schedule control block 402. The minimum bandwidth channel ID 416 may identify those objects that are associated with a particular channel. A channel may correspond to, for example, all objects that are provided by CNN. Each object that is associated with a particular channel may have a channel identifier in its meta-data. The object schedule control block 402 may identify the objects that are associated with a channel by examining the meta-data. The minimum bandwidth channel ID 416 may also identify a minimum bandwidth for that channel, and the object schedule control block 402 may attempt to schedule the objects so that the minimum bandwidth for that channel is achieved.

Figure 5:
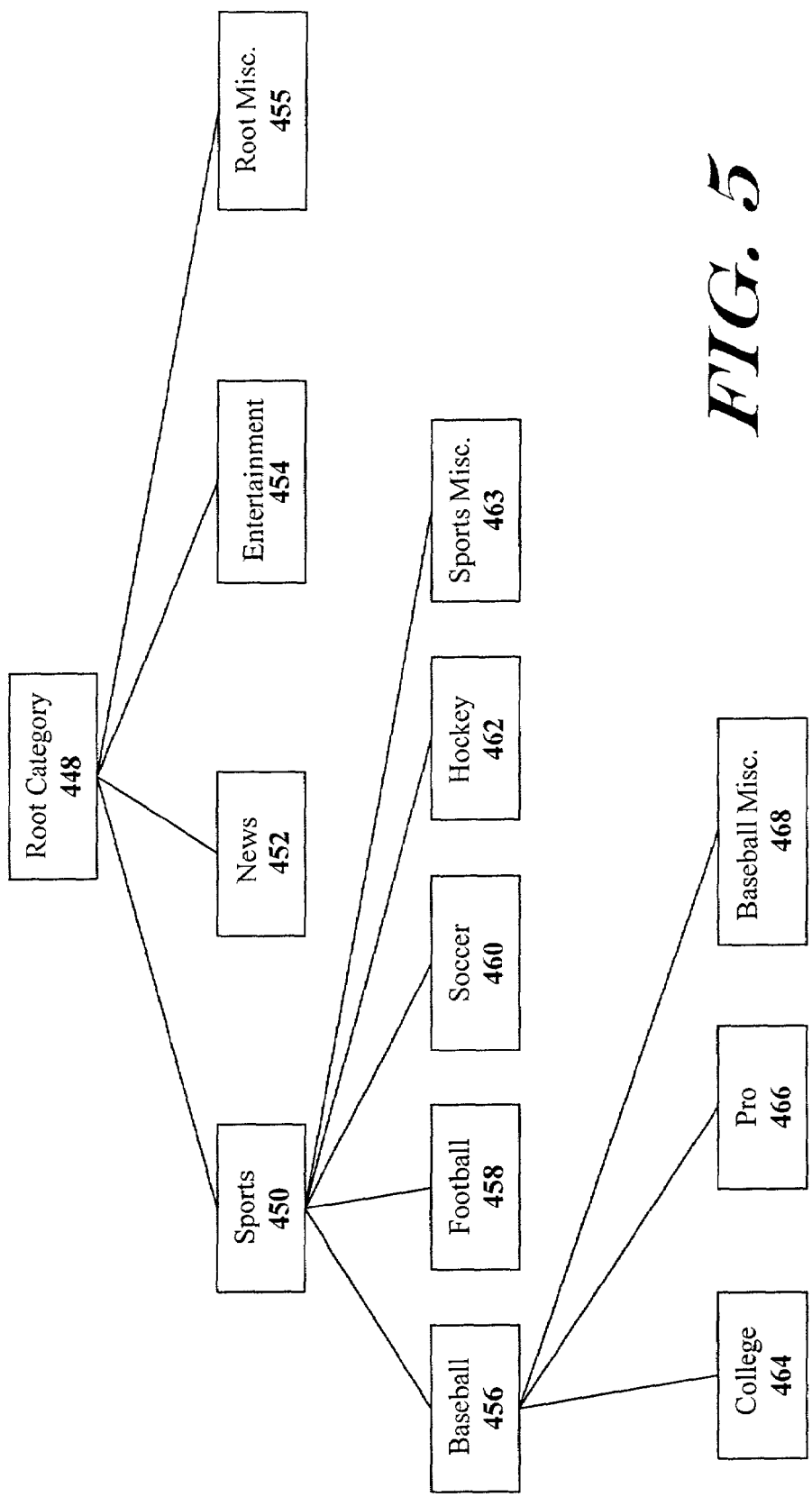
FIG. 5 is a diagram showing illustrative content classes.

To maintain a variety of objects in the object schedule, each object is preferably assigned to one or more content classes. FIG. 5 shows an illustrative arrangement of content classes 450–468. The illustrative content classes 448–466 have a hierarchical arrangement that descends from a root class 448. In this example, the sports class 450 has a set of sub-classes that include the baseball class 456, the football class 458, the soccer class 460, the hockey class 462, and the miscellaneous class 463. The baseball class 456 has a set of sub-classes that include the college class 464 and the pro class 466. In general, any of the content classes 450–468 may have sub-classes.

Each class may include a miscellaneous subclass that is used to store any content that is classified within the parent class but does not fit within any of the defined subclasses. For example, a story about the Irish sport of hurling may fall within the sports class 450 but it does not fall within any of the currently defined sports subclasses of baseball 456, football 458, soccer 460, or hockey 462. Such a story may be placed in the sports miscellaneous class 463. In such an embodiment, the miscellaneous class is treated just like another peer class.

It is often desirable to weight some of the classes more heavily than others. For example, more users may be interested in football than hurling. To accommodate this, the national and/or local broadcasting centers of FIG. 1 may assign an importance factor to each of the content classes 450–468. Because the desired weighting between classes is often dependent on the geographic region, the importance factors are preferably assigned by the local broadcasting centers, at least for some categories.

In the following, the importance factor (Imp) assigned to a content class (C) is represented as $Imp_C$. For example, the importance factor assigned to the baseball class 456 is $Imp_{BASEBALL}$ and the importance factor assigned to the football class 458 is $Imp_{FOOTBALL}$. Table I shows an example set of importance factors assigned to the content classes 450–466. The importance of the root class 448 is always equal to 1.

TABLE 1

| Content Class | Importance Factor |
|---|---|
| Root | 1.0 |
| Sports | 0.7 |
| Baseball | 0.4 |
| College | 0.4 |
| Pro | 0.6 |
| Football | 0.6 |
| Soccer | 0.5 |
| Hockey | 0.0 |
| News | 0.4 |
| Entertainment | 0.1 |

Note that in an embodiment with the miscellaneous classes, the miscellaneous classes may have their own importance settings, such as the average importance value of its peers.

A normalized importance NImp may then be determined for each of the content classes. In one embodiment, the normalized importance for the content class C ($NImp_C$) is determined by dividing $Imp_C$ by the sum of the importance factors of all the sub-classes of the parent class of C. For example, the normalized importance for the baseball class 456 ($NImp_{BASEBALL}$) may be determined by dividing $Imp_{BASEBALL}$ by the sum of the importance factors of the classes 456–468, which are all the sub-classes of the parent sports class 450 of the baseball class 456. Table 2 illustrates the normalized importance factors determined for the content classes 448–466.

TABLE 2

| Content Class | Importance Factor | Normalized Importance |
|---|---|---|
| Root | 1.0 | 1.0 |
| Sports | 0.7 | 0.583 |
| Baseball | 0.4 | 0.267 |
| College | 0.4 | 0.4 |
| Pro | 0.6 | 0.6 |
| Football | 0.6 | 0.4 |
| Soccer | 0.5 | 0.333 |

TABLE 2-continued

| Content Class | Importance Factor | Normalized Importance |
|---|---|---|
| Hockey | 0.0 | 0.0 |
| News | 0.4 | 0.333 |
| Entertainment | 0.1 | 0.083 |

A hierarchy-normalized importance HNImp may then be determined for each of the content classes. The hierarchy normalized importance for the content class C (HNImp$_C$) indicates where the C is in the hierarchy of classes and, in one embodiment, is determined by multiplying NImp$_C$ by the hierarchy normalized importance of the parent class of C. For example, the hierarchy-normalized importance for the baseball class 456 (HNImp$_{BASEBALL}$) is determined by multiplying NImp$_{BASEBALL}$ by HNImp$_{SPORTS}$ and the hierarchy normalized importance for the hockey class 462 (HNImp$_{HOCKEY}$) is determined by multiplying Nmp$_{HOCKEY}$ by HNImp$_{SPORTS}$. Table 3 shows the hierarchy normalized importance factors determined for the content classes 448–466.

TABLE 3

| Content Class | Importance Factor | Normalized Importance | Hierarchy Normalized Importance |
|---|---|---|---|
| Root | 1.0 | 1.0 | 1.0 |
| Sports | 0.7 | 0.583 | 0.583 |
| Baseball | 0.4 | 0.267 | 0.155 |
| College | 0.4 | 0.4 | 0.062 |
| Pro | 0.6 | 0.6 | 0.093 |
| Football | 0.6 | 0.4 | 0.2332 |
| Soccer | 0.5 | 0.333 | 0.194 |
| Hockey | 0.0 | 0.0 | 0.0 |
| News | 0.4 | 0.333 | 0.3333 |
| Entertainment | 0.1 | 0.083 | 0.083 |

The steps of determining the normalized importance and the hierarchy normalized importance for the content classes may be performed via a software mechanism.

A simpler approach is to assign an importance factor to only the leaf (e.g. childless) content classes. In this embodiment, and again referring to FIG. 5, only leaf classes 464, 466, 468, 458, 460, 462, 463, 454 and 455 have assigned importance values. The importance value for non-leaf content classes can be defined as the sum of the importance factors of it's leaf classes. Alternatively, the non-leaf content classes may not have an importance factor, and only the leaf content classes are used for scheduling.

Figure 6:
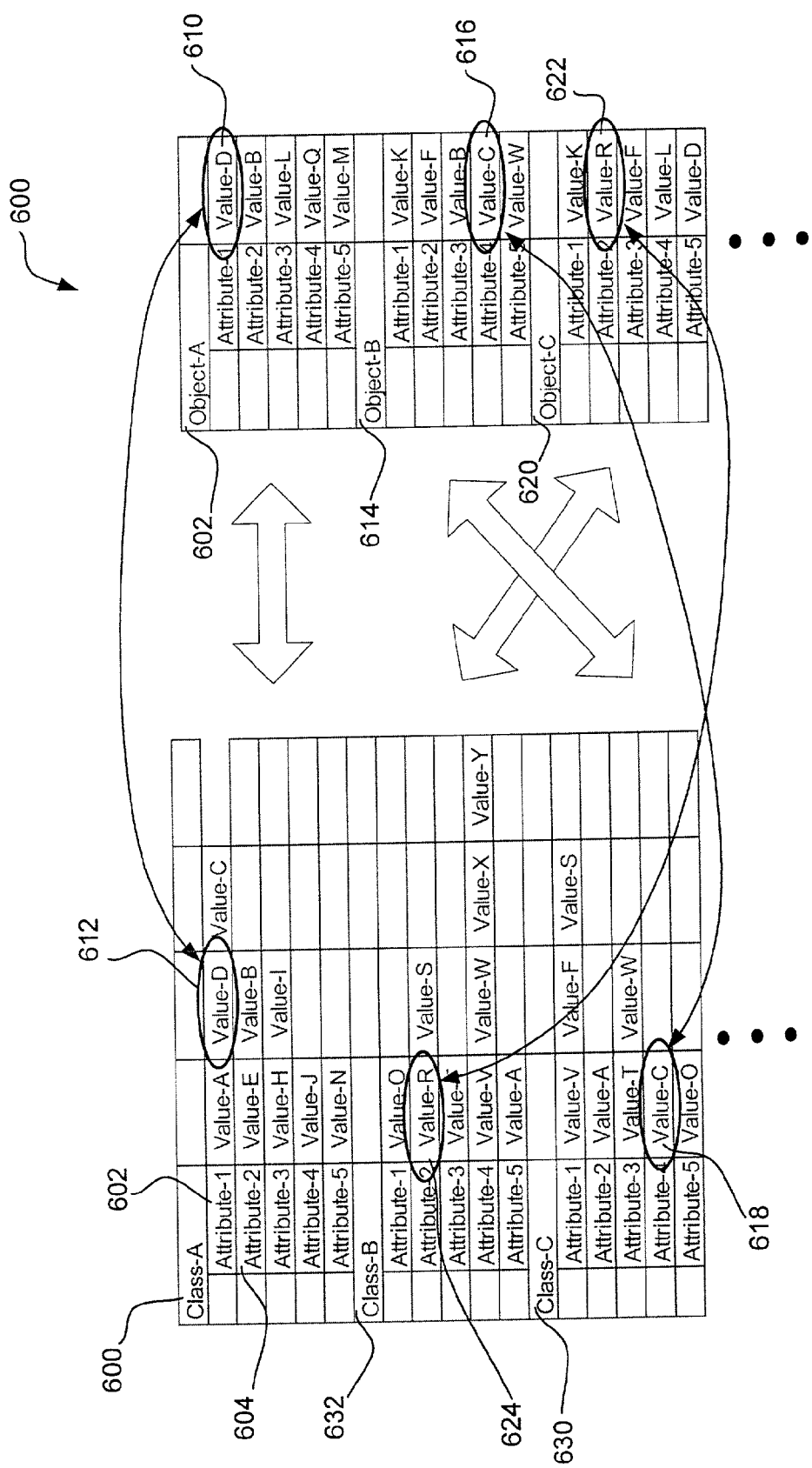
FIG. 6 is a diagram showing an illustrative method for determining member classes for an object using class list attributes of the object meta-data.

The meta-data for each object may include one or more attributes that can be used to associate the object with one or more of the content classes. FIG. 6 is a diagram showing an illustrative method for determining member classes for an object using class list attributes found in the object meta-data. Each class may have a number of attributes associated therewith, with each attribute having one or more values. For example, class-A 600 has attributes 1–5, and each attribute has at least one value associated therewith. Class-B 602 and Class-C 604 also have several attributes, with each attribute having at least one value. The attributes preferably identify general categories of information. For example, if class-A 600 is a sports class, then the attributes 1–5 in class-A 600 may identify general categories such as international sports, national sports, local sports, water sports, etc. The values associated with each attribute may identify sub-classes or categories. For example, if attribute-1 602 corresponds to water sports, then value-A, value-B and value-C may correspond to swimming, diving and water polo, respectively. Likewise, if attribute-2 604 corresponds to motor sports, then value-E and value-D may correspond to, for example, stock car racing and indy car racing. This structure may allow each class to be relatively well defined.

Each object may also have a number of class attributes, and each attribute may have one or more values associated therewith as shown at 606. The attributes and values may be defined similar to the attributes and values for the classes. The object schedule control block 402 may compare the attributes and values of each object with the attributes and values of each class. An object can be defined as belonging to a particular class if the object has the same attribute with at least one common value. For example, attribute-1 of object-A 608 has a value of "value-D" 610, which matches the value "value-D" of attribute-1 of Class-A 600. Thus, the object schedule control block 602 may conclude that object-A 608 is a member of class-A 600. Likewise, attribute-4 of object-B 614 has a value of "value-C" 616, which matches the value "value-C" of attribute-4 of Class-C 630. Thus, the object schedule control block 602 may conclude that object-B 614 is a member of class-C 630. Finally, attribute-2 of object-C 620 has a value of "value-R" 622, which matches the value "value-R" of attribute-2 of Class-B 6323. Thus, the object schedule control block 602 may conclude that object-C 620 is a member of class-B 632. Although not shown in FIG. 6, an object may be a member of multiple classes, if desired.

Another approach for identifying those objects that are in a particular class is to provide a Boolean expression of attributes and values for each class. For example, and continuing with the above example, class-A 600 may have a Boolean expression such as Class Member=((Attribute-1 and (value-A or value-B or value-C)) or (Attribute-2 and (value-E or value-B) or (Attribute-3 and (value-H or value-I) or (Attribute-4 and (value-J) or (Attribute-5 and (value-N). Then, the object schedule control block 602 may apply the attributes and values of each object to the Boolean expression to determine if the object is a member of that class. Rather than requiring an exact match, it is contemplated that a regular expression or the like may be used to provide a match between attribute and class values.

Figure 7:
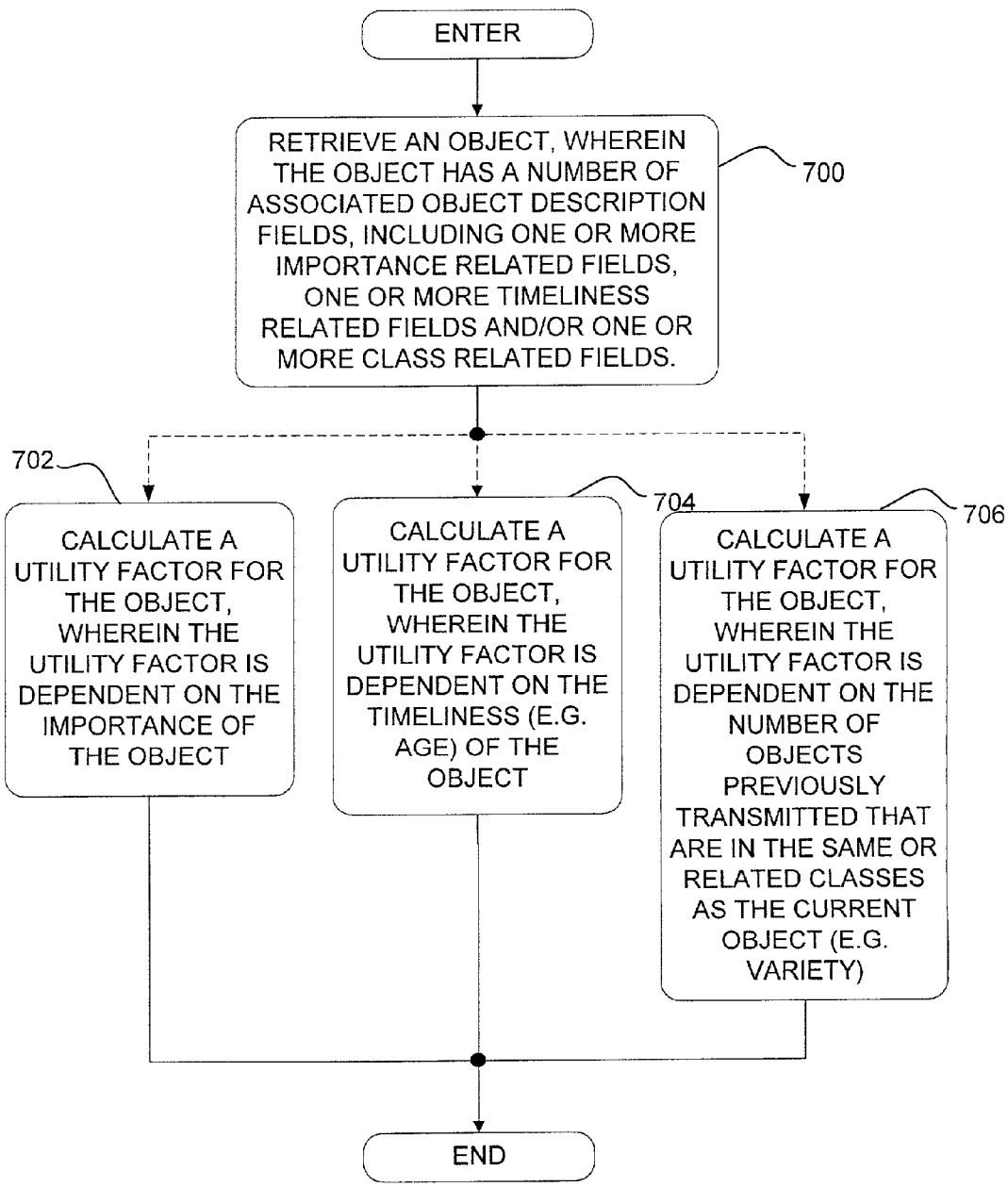
FIG. 7 is a flow diagram of an illustrative method for calculating a utility factor for an object.

FIG. 7 is a flow diagram of an illustrative method for calculating a utility factor for an object. As indicated above, incoming objects are received from a variety of sources, and certain objects are inserted into the object schedule 400. When an object is to be broadcast, the object at the top of the schedule is broadcast first. Thus, the ordering of the objects within the object schedule may be important. Generally speaking, objects that have a higher utility factor are placed toward the top of the schedule. However, there are some exceptions. For example, and because it is often desirable to optimize the utility factor of the object schedule, a more time sensitive object may be scheduled before a higher value but less time sensitive object.

The utility factor of an object can be dependent on a number of parameters, including the importance, timeliness and variety provided by the object, or any combination thereof. In the illustrative method, an object is received. The object has a number of associated object description fields, preferably in the meta-data of the object. The object description fields may include, for example, one or more importance related fields, one or more timeliness related fields, and/or one or more class related fields, as shown at 700.

As shown at 702, the object utility factor may be calculated using the importance related field(s). The importance related fields may identify the importance of the object relative to other objects. The object schedule control block 402 of FIG. 4 may use the importance related field(s) to identify which objects should be added to the object schedule 400 and which objects should be evicted, and also may be used to determine the optimum order of objects in the object schedule 400. All else being equal, an object with higher importance should be positioned higher in the object schedule 400 than an object with lower importance. As new objects are received, the objects with the lowest importance may be evicted from the object schedule 400.

As shown at 704, the object utility factor may be calculated using the one or more timeliness related fields. To identify the most timely objects at any give time, a timeliness factor may be provided for each object. The timeliness factor is preferably related to the expected age of an object when broadcast. One of the timeliness related fields may be a time indicator tag or time stamp. The expected age of an object can be calculated by determining the difference in time between the time indicator tag and the estimated broadcast time of the object. Preferably, the timeliness factor incorporates a function that decreases with the "age" of the object.

It is contemplated that the importance related field(s) and timeliness related field(s) may be used together to calculate a utility factor for the object. In one illustrative embodiment, the importance of an object is multiplied by the timeliness of the object to determine the object utility factor for the object. In this embodiment, the object utility factors are higher for those objects that are more timely, assuming the same importance factor. The timeliness of an object may include a freshness factor, as further described below.

For variety, and as shown at 706, it is contemplated that the object utility factor may be dependent on the number of objects previously transmitted in the same or related classes as the current object. That is, if many objects have already been broadcast in the same class as the current object, the utility factor for the current object may be reduced.

Figure 8:
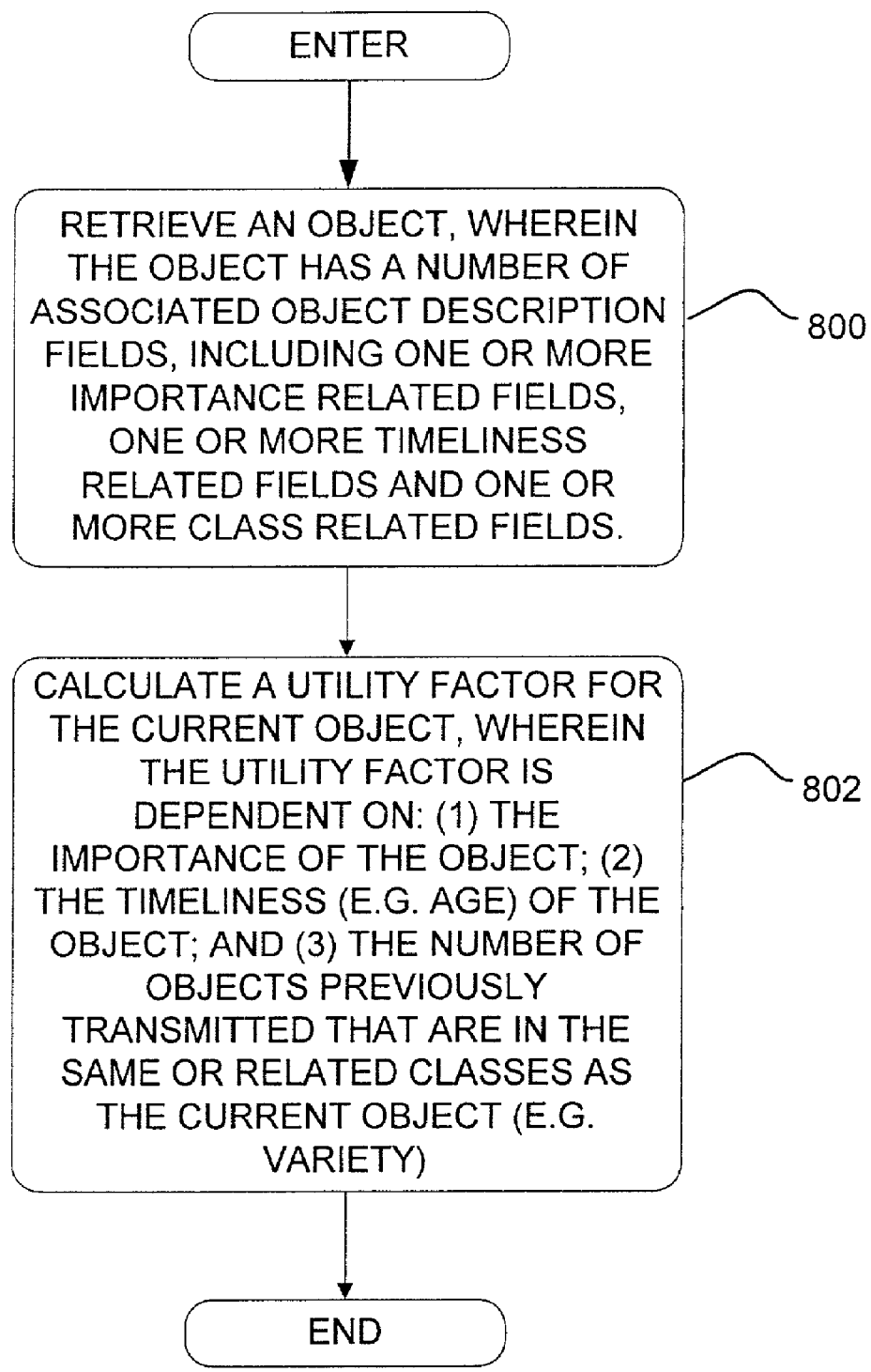
FIG. 8 is a flow diagram of another illustrative method for calculating a utility factor for an object.

FIG. 8 is a flow diagram of another illustrative method for calculating a utility factor for an object. In this illustrative method, the utility factor is dependent on the importance, timeliness and variety provided by the object. As shown at 800, an incoming object is received that has one or more importance related fields, one or more timeliness related fields, and one or more class related fields. A utility factor for the object is then calculated. As shown at 802, the utility factor may be dependent on the importance of the object, the timeliness of the object and the variety provided by the object (e.g. the number of objects that are scheduled to be transmitted before the current object from the same or related classes).

Figure 9:
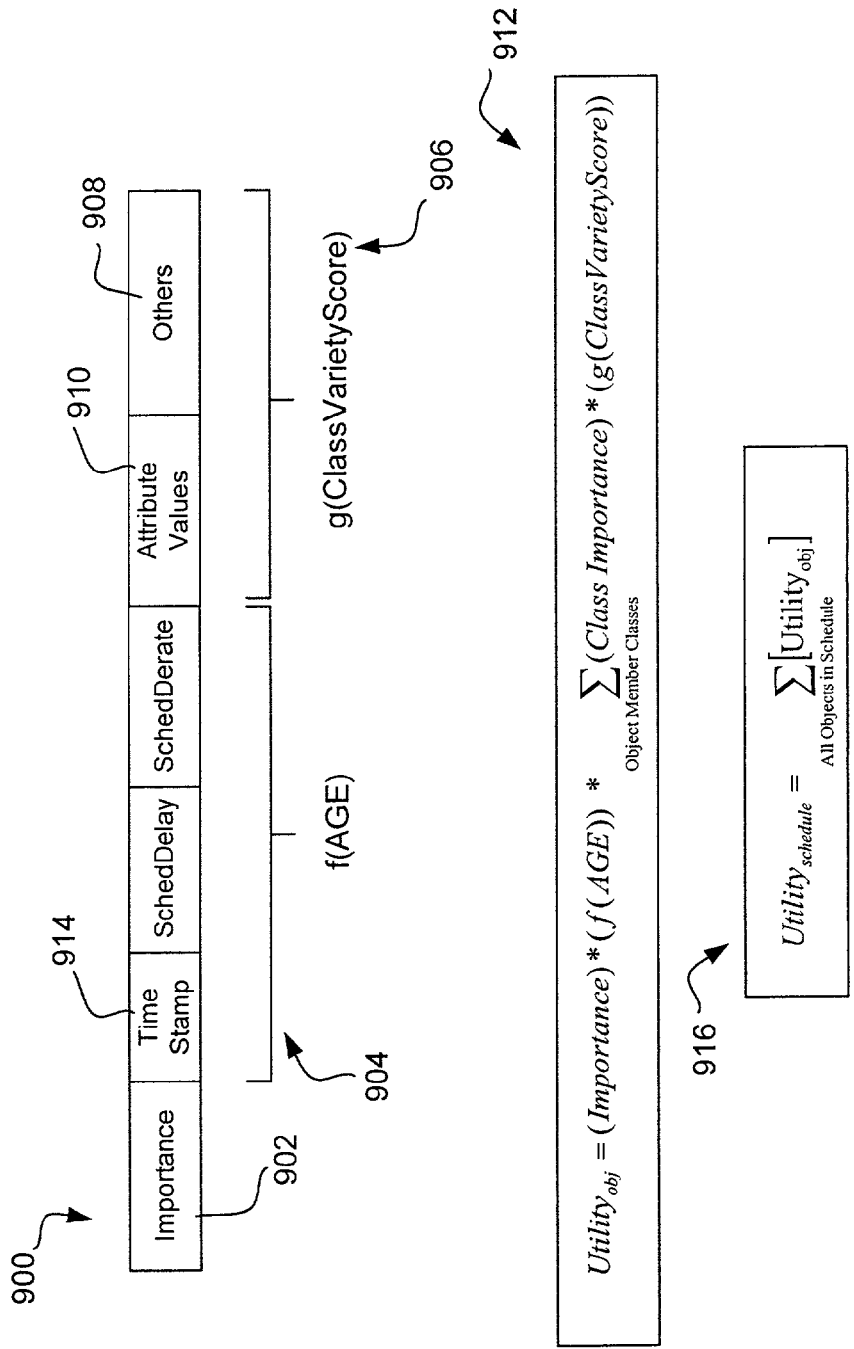
FIG. 9 is a diagram showing another illustrative method for calculating a utility factor for each object and an overall schedule utility factor for the object schedule of FIG. 4.

FIG. 9 is a diagram showing another illustrative method for calculating a utility factor for each object and an overall schedule utility factor for the object schedule of FIG. 4. Illustrative meta-data fields are shown generally at 900. The meta-data fields include an importance related field 902, a number of timeliness related fields 904, a number of variety related fields 910, and a number of other fields 908. The timeliness related fields 904 include a Time Stamp field, a Schedule Delay field (SchedDelay), and a Schedule Derate field (SchedDerate). The variety related fields 910 include a number of attribute and value fields. The attribute and value fields 910 may be used to determine which class or classes the object is a member, as discussed above with respect to FIG. 6. The significance of the remaining fields will become apparent below.

In one illustrative embodiment, the utility factor of an object is calculated using the equation shown at 912. Equation 912 multiplies the importance field 902 found in the meta-data with a timeliness function F(AGE). It is contemplated that the importance field may be scaled to fit a predetermined function or curve to provide added flexibility. The timeliness function F(AGE) is preferably a function of the expected age of the object at broadcast, and decreases with the "age" of the object.

To determine more accurately the expected "age" of an object, a current channel bandwidth may be estimated by monitoring the number of bytes that were recently transmitted over a predetermined period of time. Using the size and position of each of the objects in the object schedule 400 and the estimated channel bandwidth, an estimated time for delivery can be determined for each object. The estimated time for delivery can then be compared to the time stamp field 814 for each object in the object schedule 400 to determine the expected "age" of the object when broadcast. Since the timeliness function F(AGE) preferably decreases with the "AGE" of the object, the value of F(AGE) will be dependent on the position of the object within the schedule. Details of the illustrative timeliness function F(AGE) are further discussed below with respect to FIG. 10.

To include a measure of variety into the utility factor of an object, equation 912 sums over all classes that the object is a member, the corresponding class importance factor times a variety function g(ClassVarietyScore). The class importance factor may be similar to that discussed above with respect to FIG. 5. The variety function g(ClassVarietyScore) preferably decreases as more objects from member classes are broadcast or scheduled for broadcast within a predetermined time period. Details of the illustrative variety function g(ClassVarietyScore) are further discussed below with respect to FIG. 11.

Once a utility factor is calculated for each object in the object schedule, an overall schedule utility factor can be calculated by summing each of the object utility factors as shown at 916. When a new object arrives, the overall schedule utility factor may be updated. If the overall schedule utility factor increases, then the new object is added (and another discarded, if necessary). If the overall schedule utility factor decreases, the new object may be discarded outright.

Figure 10:
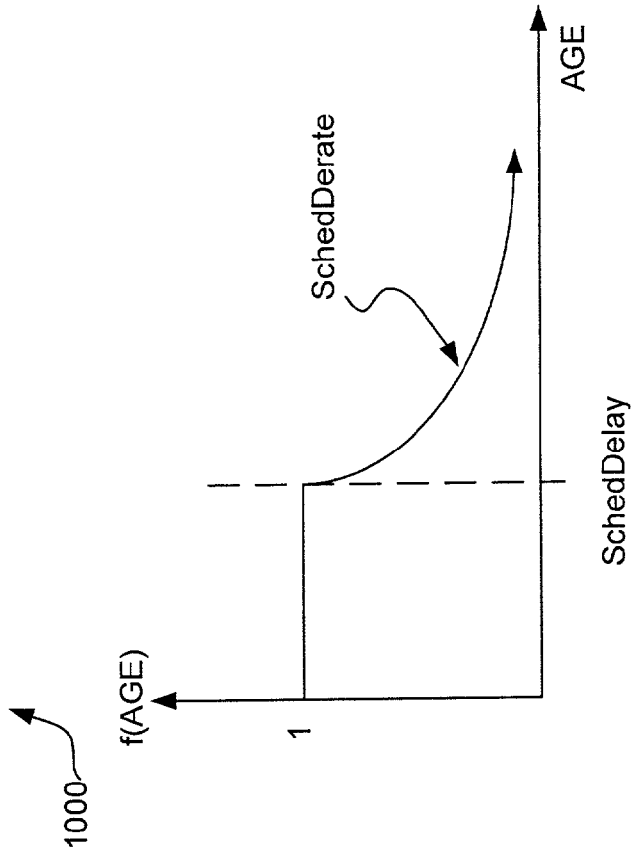
FIG. 10 is a diagram showing an illustrative F(AGE) function that may be used in FIG. 9.

FIG. 10 is a diagram showing an illustrative F(AGE) function that may be used in FIG. 9. The F(AGE) function preferably decreases with the AGE of the object. As indicated at 1000, the AGE of an object may be defined as the estimated broadcast time minus the time indicator found in the meta-data of the object. To determine the estimated broadcast time of an object, a current channel bandwidth may be estimated by monitoring the number of bytes that were recently transmitted over a predetermined period of time. Using the size and position of each of the objects in the object schedule 400 and the estimated channel bandwidth, the estimated broadcast time can be determined for each object.

The illustrative function F(AGE) has a value of "1" if the AGE is less than the SchedDelay field provided in the meta-data of the object. Once the AGE is larger than the SchedDelay field, F(AGE) decreases exponentially with the SchedDerate field. Thus, the F(AGE) function decreases with the "AGE" of the object. Accordingly, and referring back to FIG. 9, the utility of an object will be dependent on the age and thus the position of the object within the object schedule 400.

Figure 11:
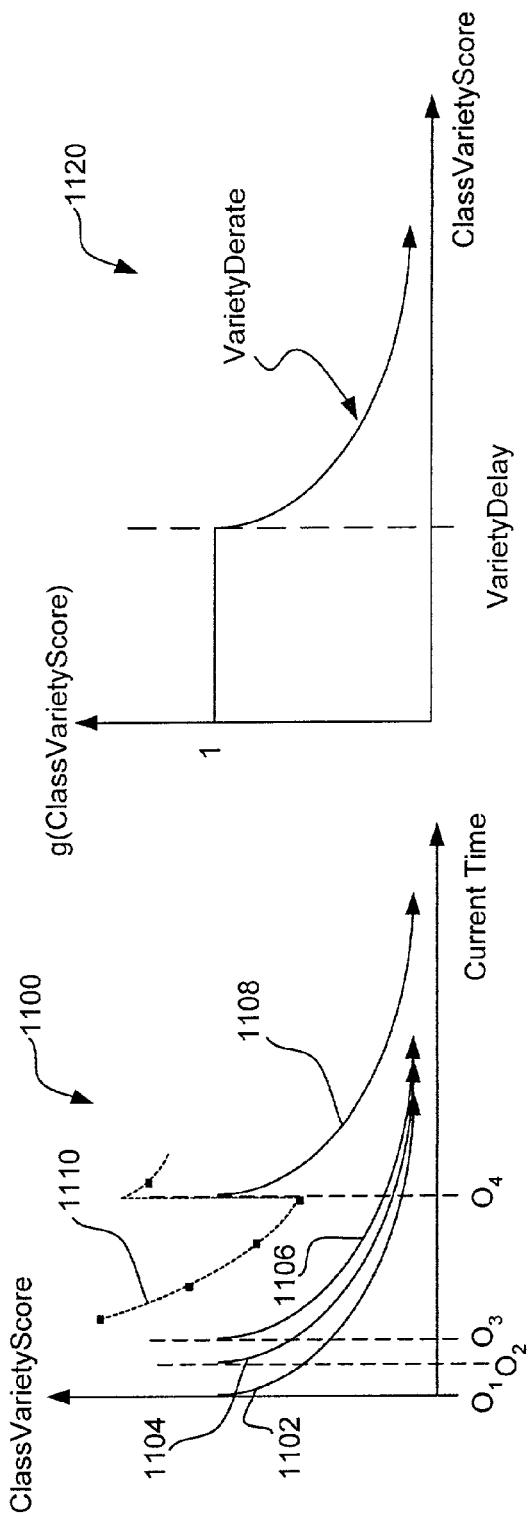
FIG. 11 is a diagram showing an illustrative g(ClassVarietyScore) function that may be used in FIG. 9.

FIG. 11 is a diagram showing an illustrative g(ClassVarietyScore) function that may be used in FIG. 9. As indicated above, the g(ClassVarietyScore) function preferably decreases as more objects from member classes are broadcast or scheduled for broadcast within a predetermined time period. The g(ClassVarietyScore) function is a function of a ClassVarietyScore parameter. One way of determining the ClassVarietyScore parameter is to sum all of the objects (or size of the objects) that are in the same class and that were previously broadcast (or are scheduled to be broadcast). The ClassVarietyScore parameter may be derated with time, so that objects that were broadcast long ago contribute less than objects that were just broadcast.

A graph is shown at 1100 that illustrates the ClassVarietyScore calculation. A first object $O_1$ is broadcast at time t=0. Subsequently, a second object $O_2$ is broadcast, followed by a third object $O_3$ and a fourth object $O_4$ as shown. The contribution of each of the objects to the ClassVarietyScore is initially one (1) and then declines exponentially with time as shown at 1102, 1004, 1106 and 1108. The sum of these contributions is shown at 1110, which represents the ClassVarietyScore parameter. The sum may be maintained by simply adding one to the a ClassVarietyScore parameter each time an object is broadcast, while continuously derating the ClassVarietyScore parameter with time.

Referring to the graph shown at 1120, the g(ClassVarietyScore) function has a value of "1" if the ClassVarietyScore is less than the VarietyDelay field. Once the ClassVarietyScore is larger than the VarietyDelay field, g(ClassVarietyScore) decreases as the inverse of the VarietyDerate field, which can be adjusted to provide the desired variety of content. The VarietyDelay field and the VarietyDerate field are preferably provided along with the class definitions, which are often stored at the local broadcast center. Accordingly, and referring back to FIG. 9, the utility of an object may be dependent on the number (or size) of objects or the sum value of objects previously broadcast (or scheduled to be broadcast) from member classes within a predetermined time period.

FIG. 12 is a diagram showing another illustrative method for calculating an overall schedule utility factor for the object schedule of FIG. 4. In one illustrative method, an intrinsic utility $V_k$ of an object "k" equals the importance field times the F(AGE) function described above. The intrinsic utility factor $V_k$ for each object in the object schedule 400 is calculated. Then, for each class, the intrinsic utility factors $V_k$ for all objects in the class are summed together, and the result is divided by the number (or size) of the objects in the class. The result is then multiplied by the class importance factor for the particular class, thereby providing a utility factor for each class. The overall schedule utility factor is then calculated by summing the class utility factors for each class.

In another embodiment, the intrinsic utility $V_k$ of each object "k" may equal the importance field times the F(AGE) function described above, times a freshness function R(AGE) as shown. The freshness function R(AGE) preferably has a value of zero until the expected broadcast time. Then, the freshness function R(AGE) has a value of one, which then decreases with time. The resulting intrinsic utility $V_k$ for each object can then be used to calculated the overall schedule utility factor, as shown in FIG. 13. In yet another embodiment, the intrinsic utility $V_k$ for some object may include the freshness function R(AGE) while other objects may not. An example of an object that may not include a freshness function may include a movie listing.

Using this approach, the overall schedule utility factor can be thought of as "the sum of the utility factors of its classes, each of which is the average utility factor of its objects". A limitation of this approach is that the overall schedule utility factor can go down if an object is added that has an intrinsic utility factor that is less than the average intrinsic utility factor of the class, even when nothing is removed from the object schedule 400. Intuitively, however, more is better at least until the object schedule is full.

FIG. 13 is a diagram showing yet another illustrative method for calculating an overall schedule utility factor for the object schedule of FIG. 4. In this illustrative method, the intrinsic utility $V_k$ of an object "k" again equals the importance field times the F(AGE) function described above, and the freshness function R(AGE) if desired. However, for each class, the intrinsic utility factors $V_k$ for all member objects are combined together using a sub-linear function such as square root, cubed-root, log(1+x), etc. A sub-linear function provides diminishing returns for additional objects that are added to a class, which may help promote variety in the object schedule 400.

In the embodiment shown, the sub-linear function is a square root function. A square root function is desirable because of the analogy with orthogonal vector addition, and because it is relatively weak in its diminishing returns. It is contemplated that the function that is applied may differ between classes. That is, one function may be used for one class, and another function may be used for another class. Some classes may use a function that does not produce a diminishing return, such as a linearly summing function. Regardless of the function used, the result is preferably multiplied by the corresponding class importance factor to provide a utility factor for each class. The overall schedule utility factor can then be calculated by summing the class utility factors for each class.

FIG. 14 is a diagram showing another illustrative method for calculating a utility factor for an object. In this embodiment, the intrinsic utility $V_k$ of an object equals the importance field times a remaining lifetime function L(t) divided by a maximum lifetime function $L_{max}$. An illustrative remaining lifetime function is shown in FIG. 15. As can be seen, the remaining lifetime of an object "k" at a current time "t" is the integral of the timeliness function $f_k(t')$ times the freshness function $R_k(t')$ from the current time to infinity. Likewise, an illustrative maximum lifetime function for an object "k" is shown in FIG. 16, and is equal to the integral of the timeliness function $f_k(t')$ times the freshness function $R_k(t')$ from the time the object was created to infinity. Thus, the ratio $L_k(t)/Lmax_k$ represents the percent of the lifetime that is remaining for object "k".

Referring back to FIG. 14, the ratio $L_k(t)/Lmax_k$ is used to calculate an intrinsic object utility $V_k$ for each object. Like above, the intrinsic object utility $V_k$ represents the value that an object "k" is expected to provide to the object schedule. An object that is provided close in time to when it the object was created provides an intrinsic object utility that is substantially equal to the object importance. An older object, however, provides an intrinsic object utility that is reduced proportionally to the percent of the lifetime that is remaining for that object. This represents a compromise between expectations favoring long-lived objects and expectations favoring high short-term value.

FIG. 17 is a diagram showing an illustrative method for calculating an expected incremental value (EIV) for each object in the object schedule. The expected incremental value (EIV) represents how much more the object schedule is worth with an object than without it. The term "V_o" used in FIG. 17 is preferably the intrinsic object utility $V_k$ calculated in FIG. 14.

In one illustrative embodiment, the utility of an object schedule is determined by summing the ecptected incremental values EIV, for all objects in the object schedule, with each expected incremental value EIV discounted by an exponential factor $e^{-\alpha t}$. The "$\alpha$" term preferably represents a constant, and the time term "t" preferably represents the expected time of the broadcast minus the current time. Thus, the incremental value EIV for each object may be discounted by an amount that is dependent on the position of the object in the object schedule.

In another illustrative embodiment, a priority score is calculated for each object in the object schedule. One such priority score is shown in FIG. 19, and is related to the current rate of change of $EIV_k(t)e^{-\alpha t}$, or an approximation thereof. Once a priority score is calculated for each object in the object schedule, the object scheduler 400 may send the object with the highest priority score. Using this approach, the object scheduler 400 first sends those objects that are the most expensive to put off. The object size may also be used to weight the priority score, if desired.

An advantage of providing a priority score is that the object scheduler need not continually search for a better broadcast order. Rather, each object is give a score, which is independent of what is to follow, and the highest score object is sent. This "greedy" approach loses some opportunities for global optimization, but is less CPU intensive, easier to implement, and is more intuitive in its behavior.

Figure 20A:
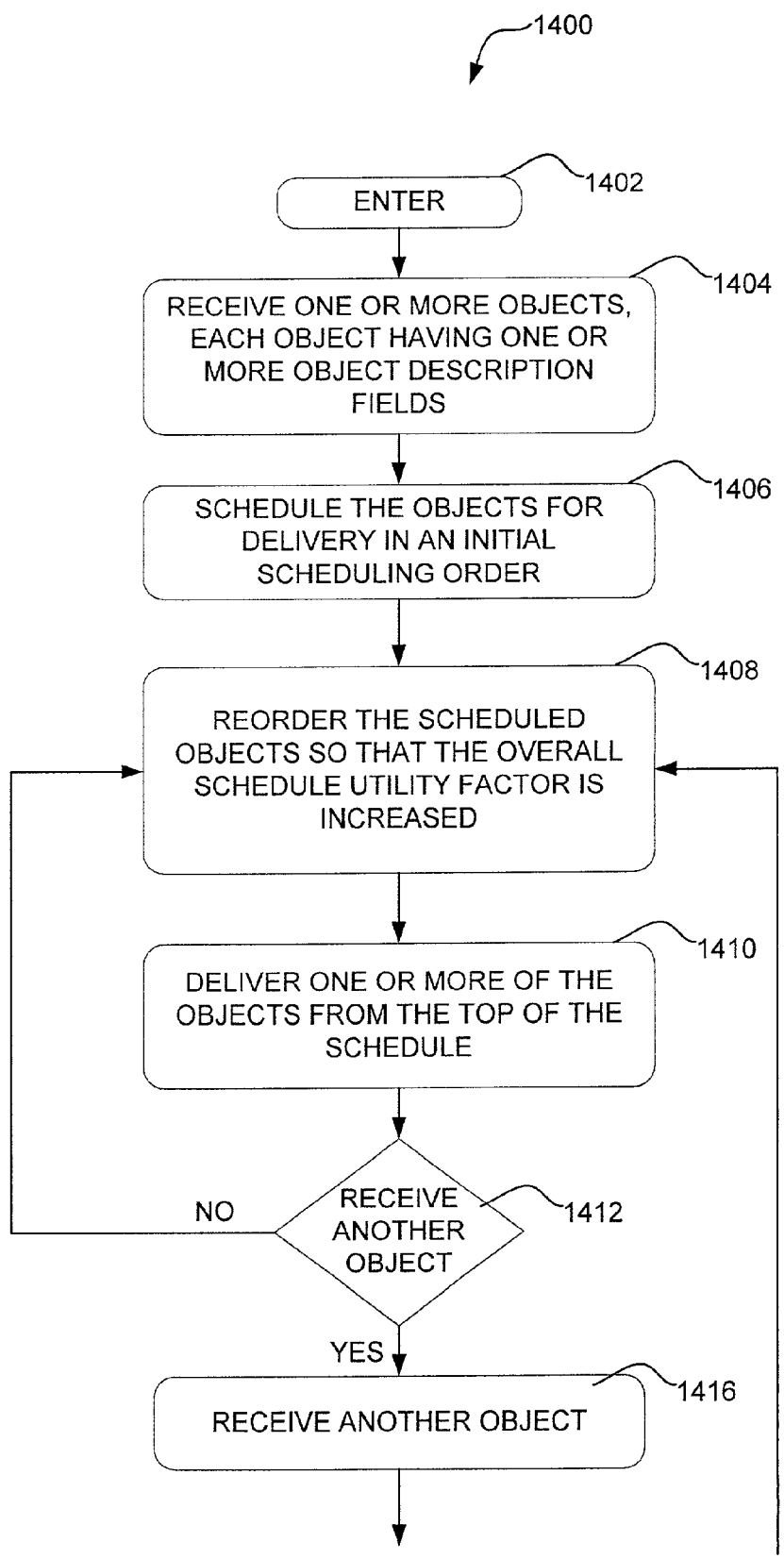
FIGS. 20A–20B show a flow diagram of an illustrative method for placing incoming objects in the object schedule of FIG. 4.
Figure 20B:
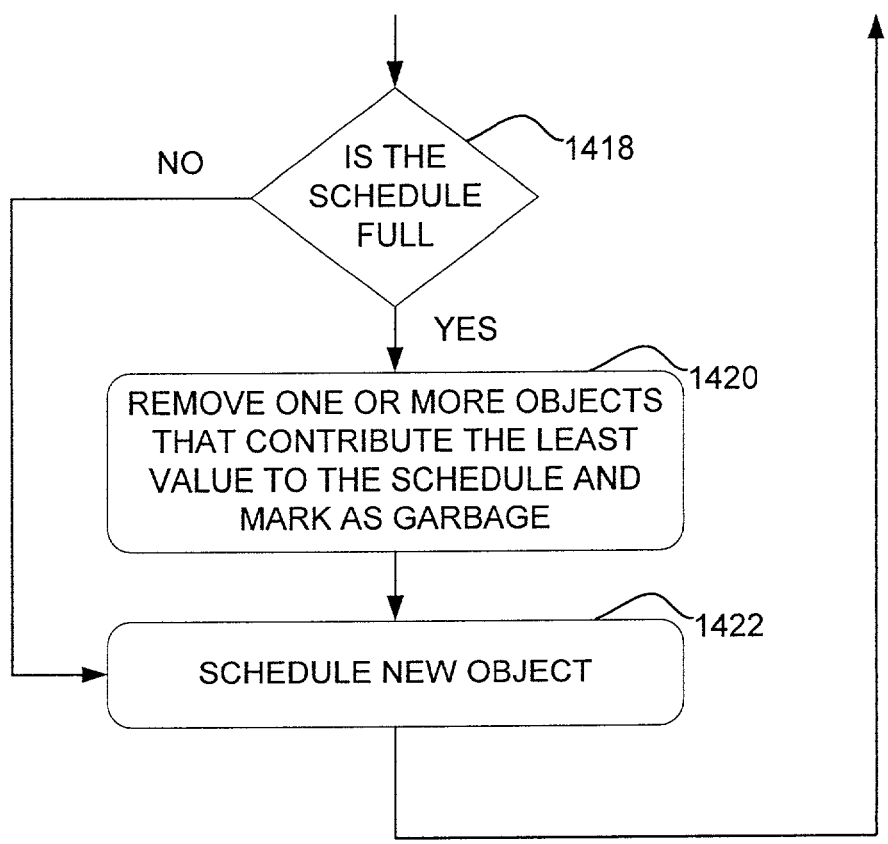

FIGS. 20A–20B show a flow diagram of an illustrative method for placing incoming objects in the object schedule of FIG. 4. The flow diagram is generally shown at 1400. Step 1404 receives one or more incoming objects. Each object has one or more object description fields, preferably provided in the object meta-data.

The object scheduler 310 schedules the objects for delivery in an initial scheduling order, as shown at 1406. The object schedule control block 402 then reorders the scheduled objects so that the overall schedule utility factor of the object schedule 400 is increased, as shown at 1408. When requested, the object scheduler 310 delivers one or more of the objects from the top of the schedule, as shown at 1410.

Step 1412 determines whether there are any more incoming objects. If there are no more incoming objects, control is passed back to step 1408, wherein the object schedule control block 402 reorders the scheduled objects to further optimize the ordering of the objects in the object schedule 400, since it is likely that an optimum ordering may not yet have been found.

Once one or more objects become available, control is passed to step 1416. Step 1416 receives another object. Step 1418 determines if the object schedule 400 is full. If the object schedule 400 is not full, control is passed to step 1422 and the object is placed in the object schedule 400. Then, control is passed back to step 1408, where the objects are again reordered to optimize the ordering of the objects in the object schedule 400.

If the object schedule 400 is full, one or more of the objects that contribute the least value to the object schedule are removed to make room for the incoming object, as shown at 1420. The incoming object is then placed in the object schedule 400, as shown at 1422. Control is then passed back to step 1408, where the objects in the object schedule 400 are again reordered to optimize the ordering of the objects in the object schedule 400.

Figure 21A:
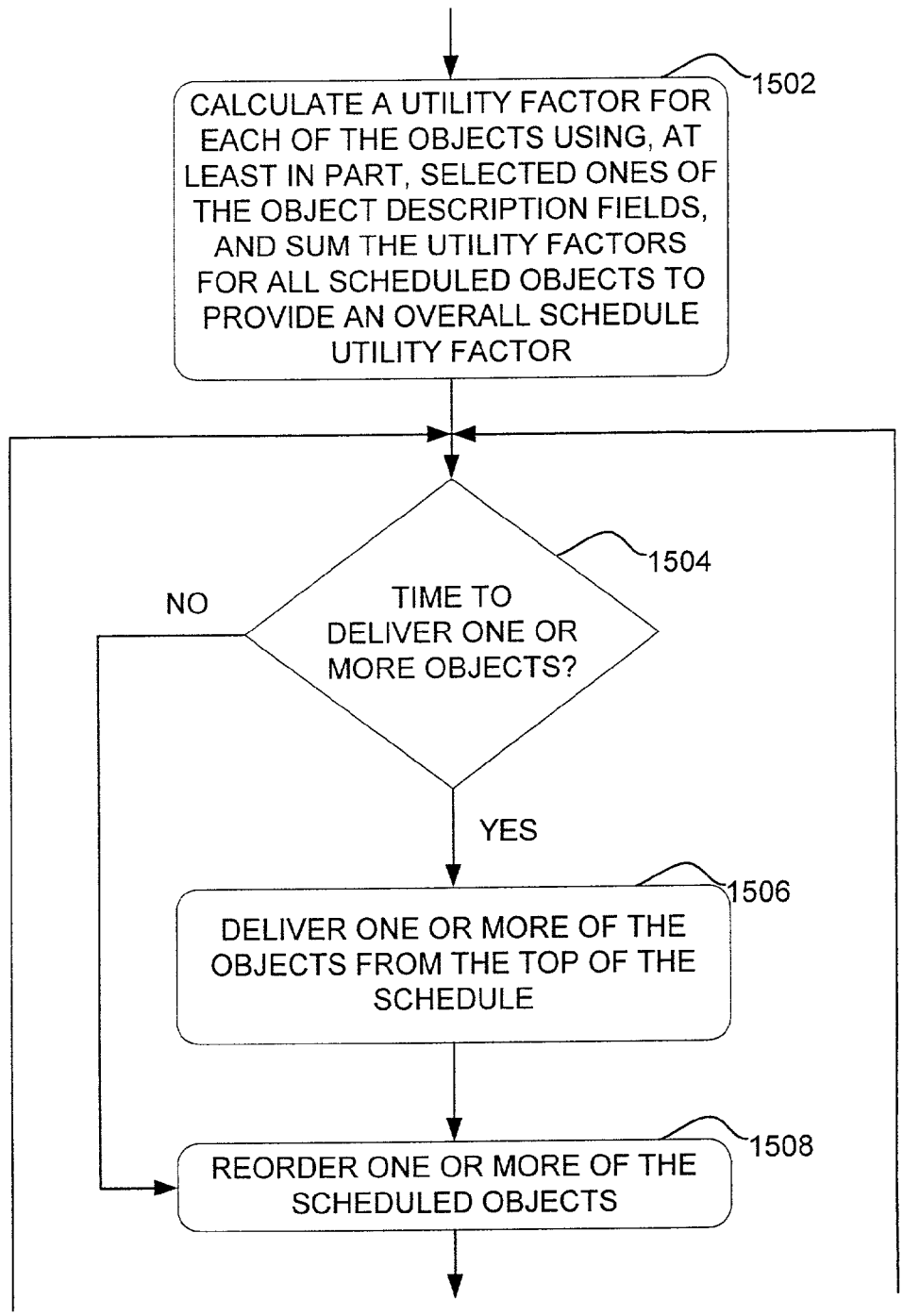
FIGS. 21A–21B show a flow diagram of an illustrative method for optimizing the object schedule of FIG. 4.
Figure 21B:
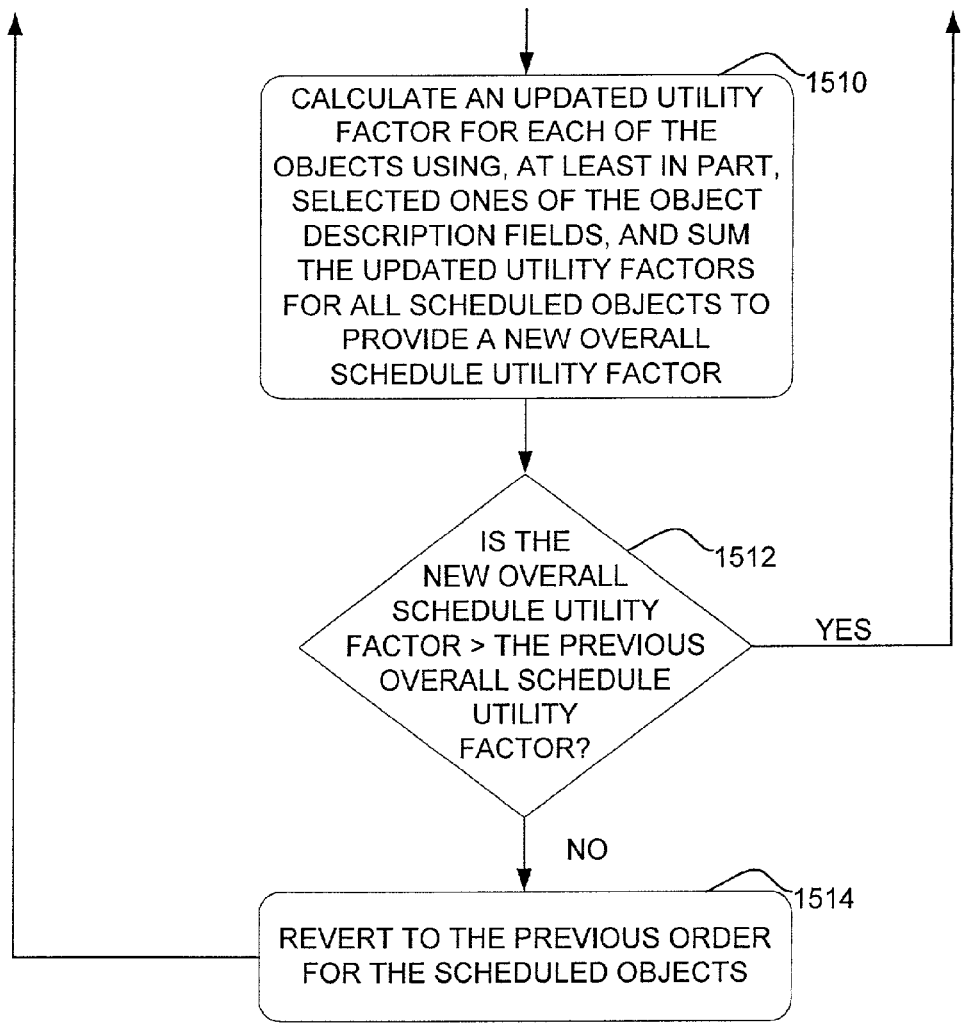

FIGS. 21A–21B show a flow diagram of an illustrative method for optimizing the object schedule of FIG. 4. In this illustrative method, a utility factor is calculated for each of the objects in the object schedule 400. The utility factor is preferably calculated using, at least in part, selected object description fields. The intrinsic utility factors for the objects are summed together to provide an overall schedule utility factor for the object schedule 400, as shown at 1502.

Step 1504 determines if it is time to deliver one or more of the objects in the object schedule. If it is time to deliver one or more of the objects, step 1506 selects and delivers the objects from the top of the schedule. If is not time to deliver one or more objects, control is passed to step 1508. Step 1508 reorders the objects in the object schedule. Once reordered, updated utility factors are calculated for each object, and an updated overall schedule utility factor is provided, as shown at 1510. Step 1512 determines if the new overall schedule utility factor is greater than the previous overall schedule utility factor. If the new overall schedule utility factor is greater than the previous overall schedule utility factor, control is passed back to step 1504. If the new overall schedule utility factor is not greater than the previous overall schedule utility factor, the scheduled objects are returned to their previous order, and control is passed back to step 1504.

Figure 22A:
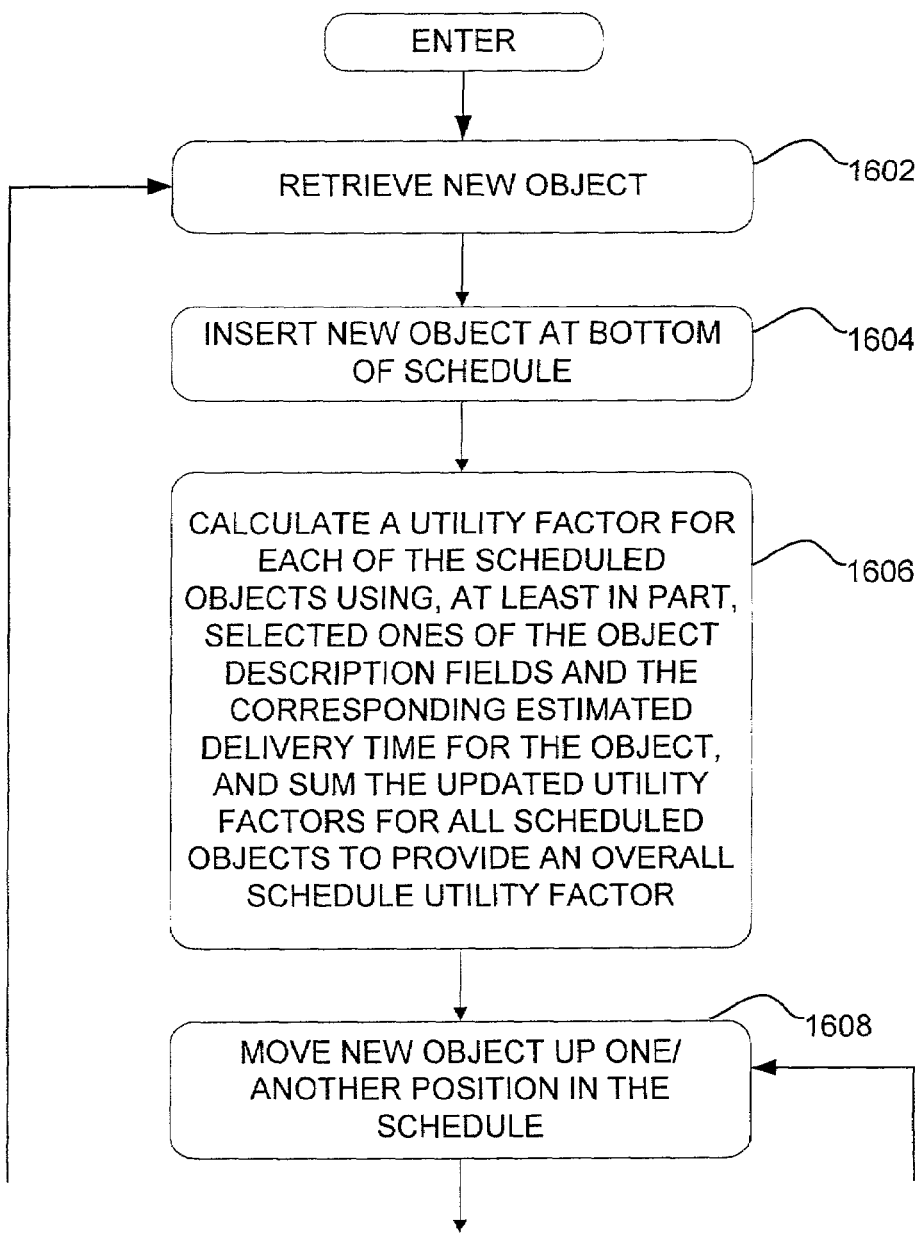
FIGS. 22A–22B show a flow diagram of another illustrative method for optimizing the object schedule of FIG. 4.
Figure 22B:
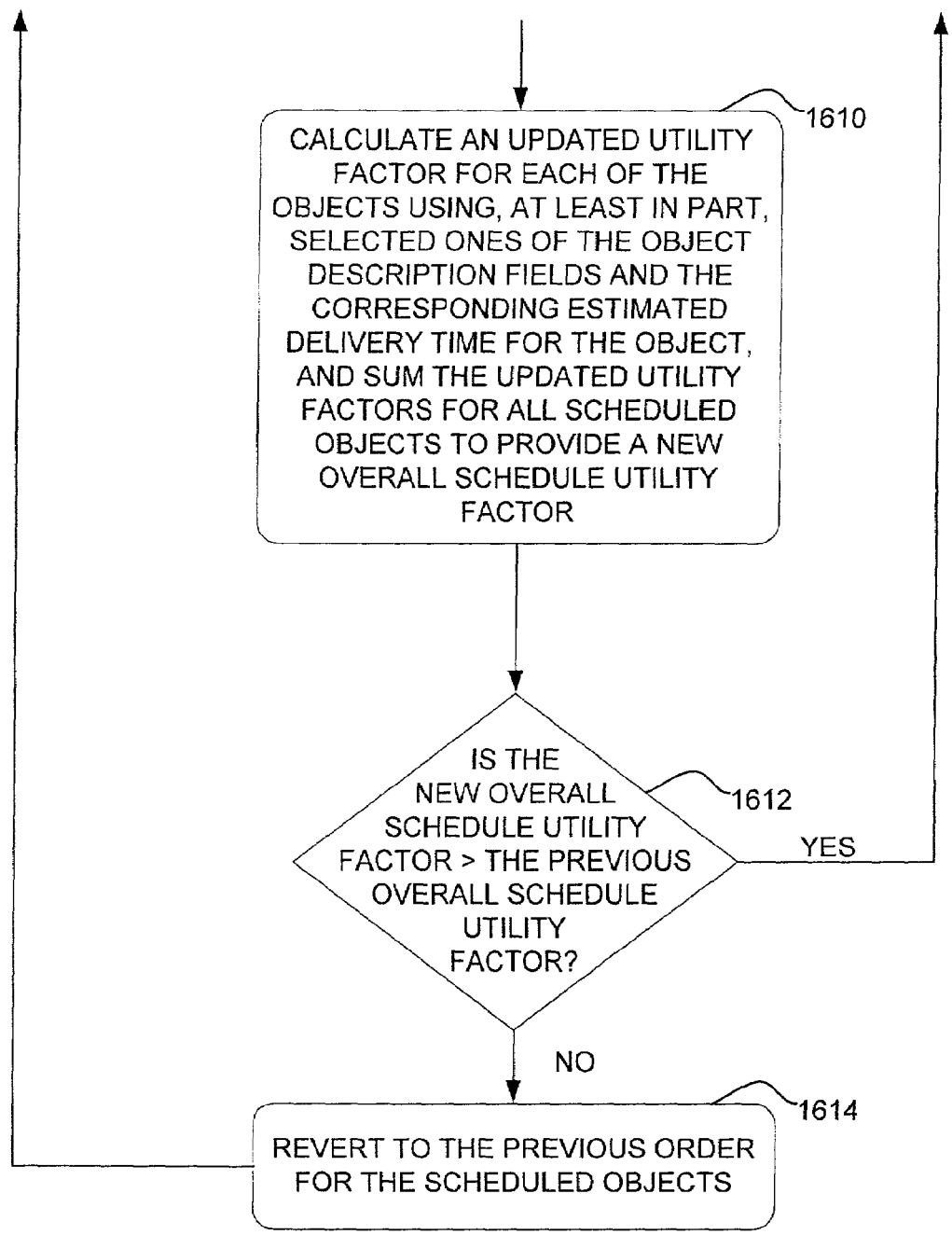

FIGS. 22A–22B show a flow diagram of another illustrative method for optimizing the object schedule if FIG. 4. In this illustrative method, a new object is retrieved at step 1602. The new object is inserted at the bottom of the object schedule 400, as shown at step 1604. Then, a utility factor is calculated for each of the objects in the object schedule 400. The utility factor is preferably calculated using, at least in part, selected object description fields that relate to the timeliness of the object. Other object description fields may also be used if desired. The intrinsic utility factors for the objects are then summed together to provide an overall schedule utility factor for the object schedule 400, as shown at 1606.

The new object is then moved up one position in the object schedule 400, as shown at 1608. Then, an updated utility factor is calculated for each of the objects, preferably using one or more object description fields that relate to the timeliness of the object. The intrinsic utility factors for the objects are then again summed together to provide a new overall schedule utility factor for the object schedule 400, as shown at 1610.

Step 1612 determines if the new overall schedule utility factor is greater than the previous overall schedule utility factor. If the new overall schedule utility factor is greater than the previous overall schedule utility factor, control is passed back to step 1608 wherein the object is moved up another position in the object schedule 400. This is continued until the new overall schedule utility factor is not greater than the previous overall schedule utility factor. Once this occurs, the object is returned to the previous position in the object schedule 400, and control is passed back to step 1602.

Figure 23A:
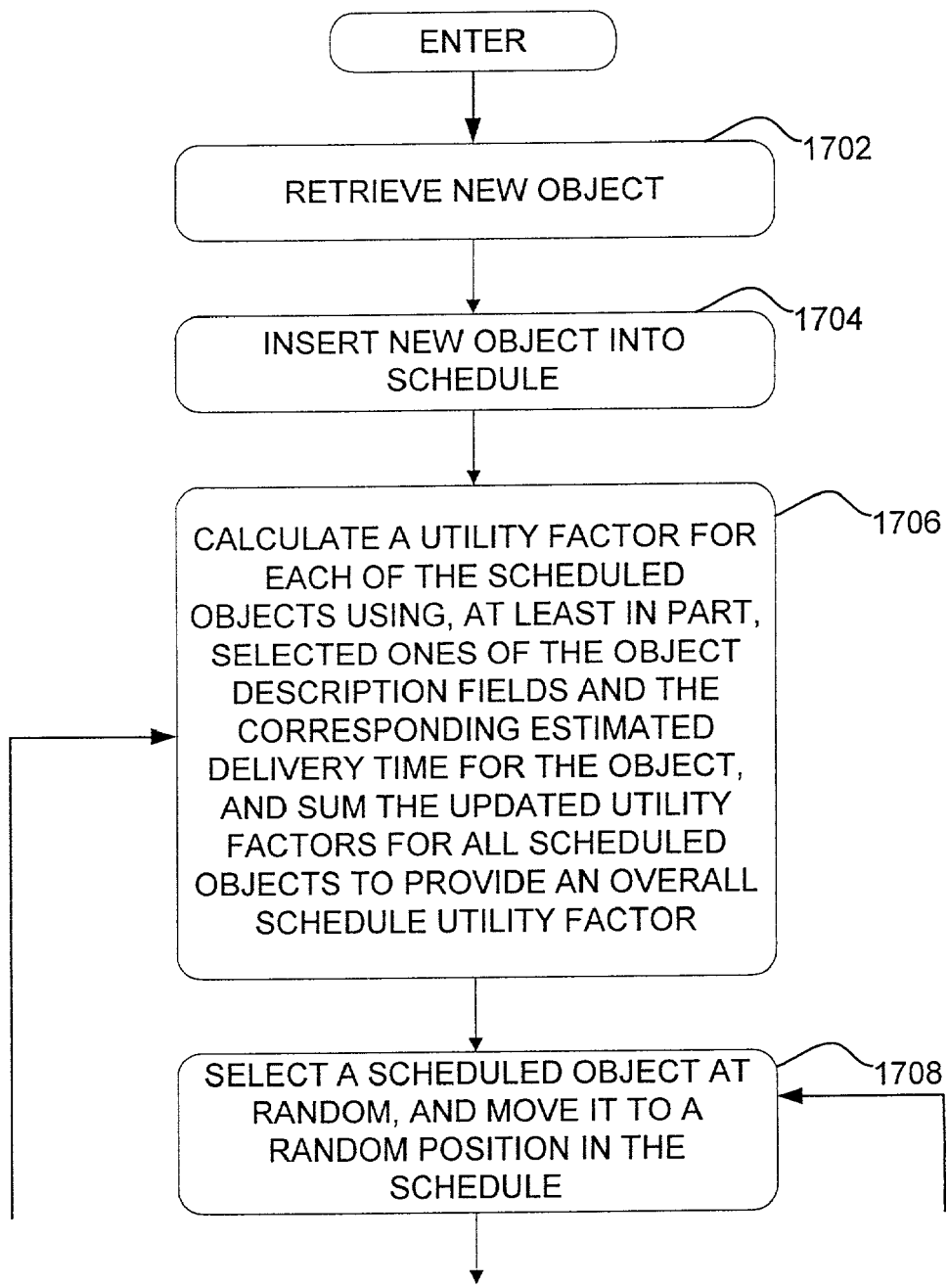
FIGS. 23A–23B show a flow diagram of yet another illustrative method for optimizing the object schedule of FIG. 4.
Figure 23B:
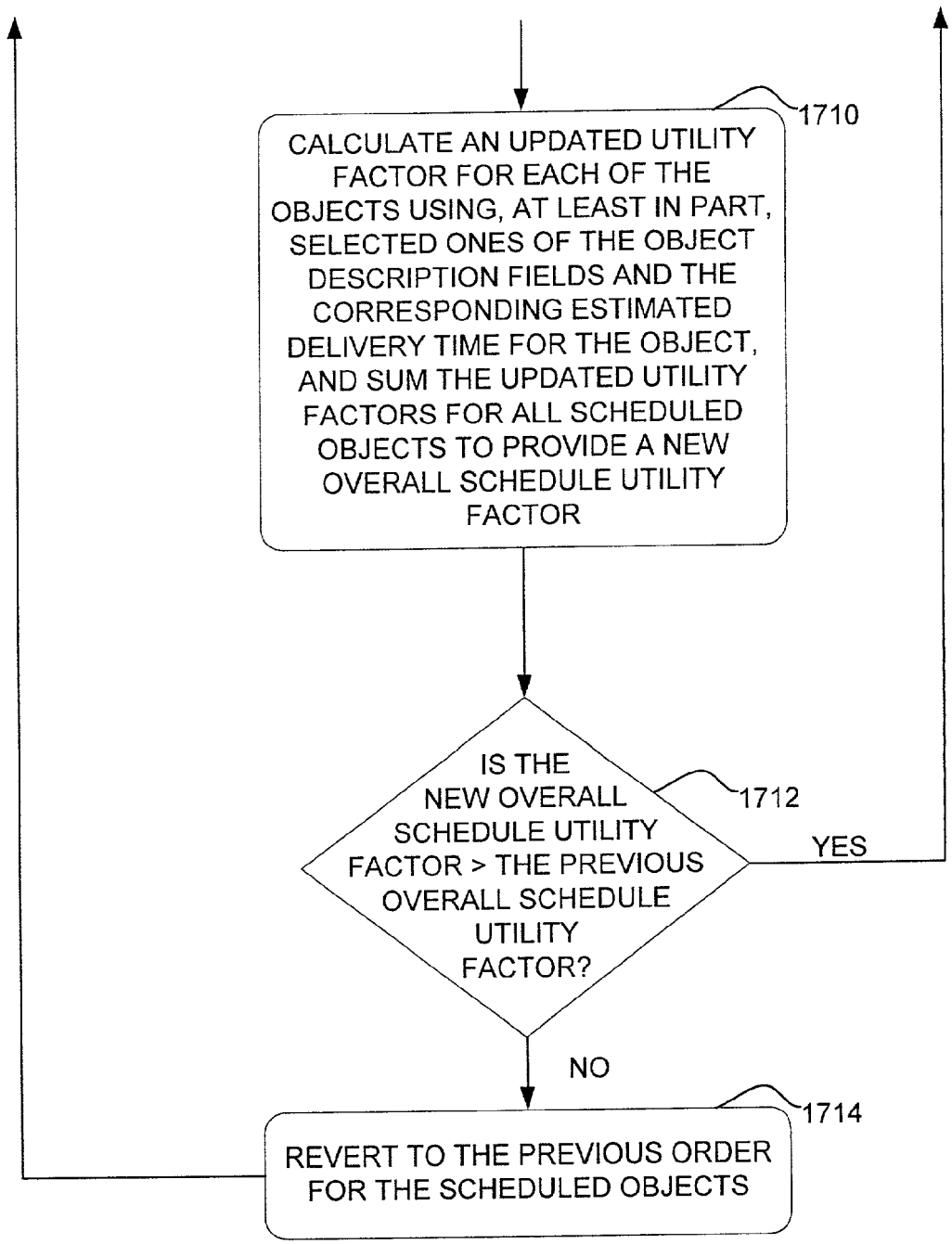

FIGS. 23A–23B show a flow diagram of yet another illustrative method for optimizing the object schedule of FIG. 4. This illustrative method is similar to that described with reference to FIGS. 22A–22B, but attempts to optimize the order of the objects in the object schedule by randomly moving the objects within the object schedule 400.

Beginning, at step 1702, a new object is retrieved. The new object is inserted into the object schedule 400, as shown at step 1704. The new object may be inserted at the bottom of the object schedule, at a random position within the object schedule, or at any other place within the object schedule. A utility factor is then calculated for each of the objects in the object schedule 400. The utility factor is preferably calculated using, at least in part, selected object description fields that relate to the timeliness of the object. Other object description fields may also be used, if desired. The intrinsic utility factors for the objects are then summed together to provide an overall schedule utility factor for the object schedule 400, as shown at 1706.

An object within the object schedule 400 is then selected, and moved to a random position within the schedule, as shown at 1708. An updated utility factor is then calculated for each of the objects, preferably using one or more object description fields that relate to the timeliness of the object. The intrinsic utility factors for the objects are again summed together to provide a new overall schedule utility factor for the object schedule 400, as shown at 1710.

Step 1712 determines if the new overall schedule utility factor is greater than the previous overall schedule utility factor. If the new overall schedule utility factor is greater than the previous overall schedule utility factor, control is passed back to step 1708, wherein an object is again selected and moved to a random position within the schedule, as shown at 1708. If the new overall schedule utility factor is not greater than the previous overall schedule utility factor, the object is returned to the previous position in the object schedule 400 as shown at step 1714, and control is passed back to step 1706.

If the new overall schedule utility factor is greater than the previous overall schedule utility factor, control may be passed to step 1708, wherein another object may be selected from the object schedule and moved to a random position within the schedule, as described above. This may be continued until a new object becomes available. Thus, the order of the objects within the object schedule may be continually optimized by the object schedule control block 402. Concurrent with the above schedule optimization, new objects may be inserted into the object schedule as they become available. Other methods for optimizing the object schedule are also contemplated including simulated annealing and tabu searching, which may give some probability of accepting orderings of lower utility.

Figure 24:
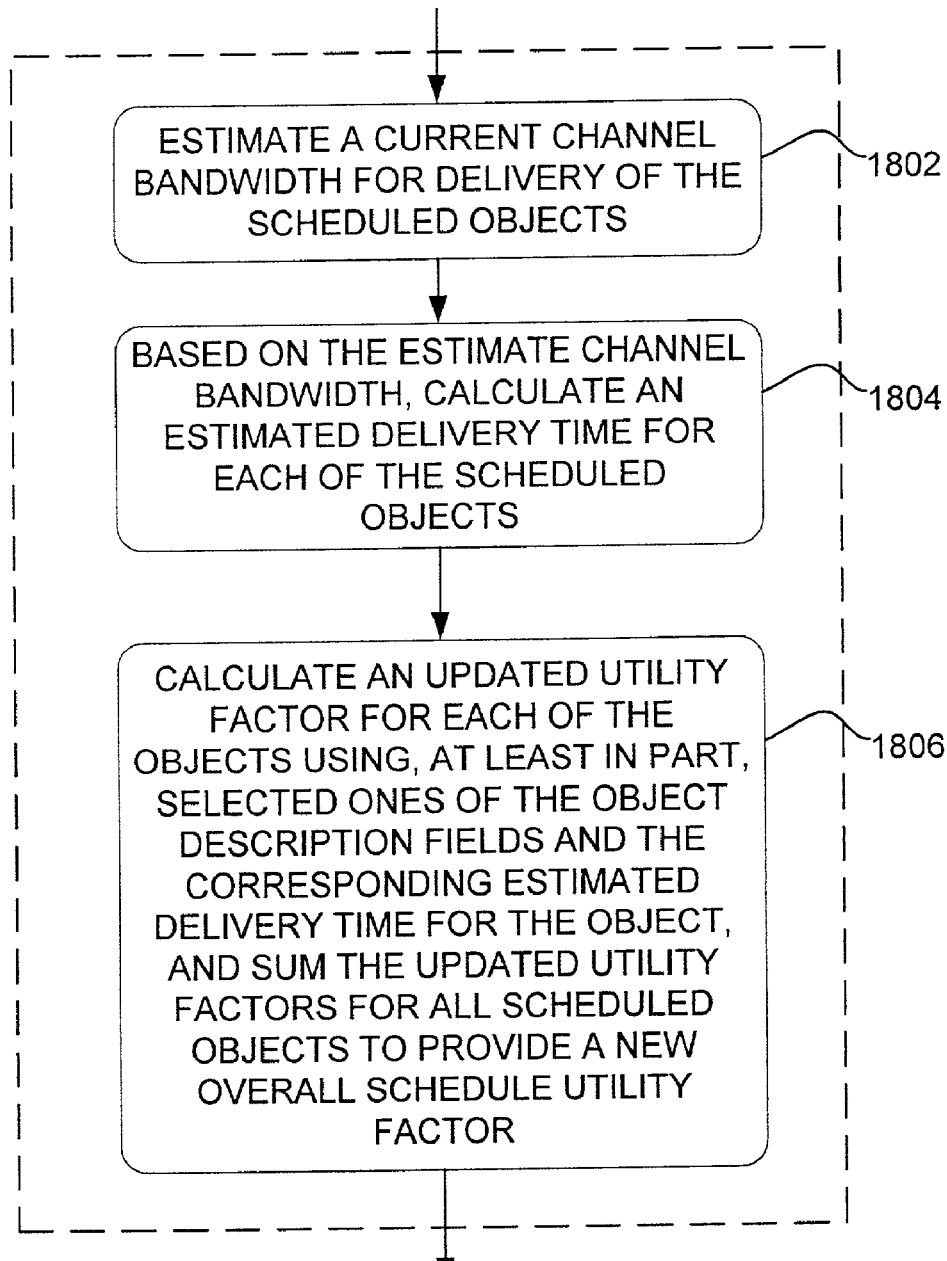
FIG. 24 is a flow diagram showing an illustrative method for calculating an updated overall schedule utility factor.

FIG. 24 is a flow diagram showing an illustrative method for calculating an updated overall schedule utility factor. As indicated above, to identify the most timely objects at any give time, a timeliness factor may be calculated for each object. The timeliness factor is related to the expected age of an object when broadcast. Each object may have a time indicator tag or time stamp, preferably provided in one or more object description fields in the meta-data of the object. The expected age of an object can then be calculated by determining the difference in time between the time indicator tag and the estimated broadcast time of the object. Preferably, the timeliness factor incorporates a function that decreases with the "age" of the object.

To determine more accurately the expected "age" of an object, a current channel bandwidth may be estimated, as shown at 1802. The channel bandwidth estimator block 406 of FIG. 4 preferably monitors the number of bytes that were recently transmitted over a predetermined period of time, and estimates the current channel bandwidth therefrom. Then, using the size and position of each of the objects in the object schedule 400 and the estimated channel bandwidth, an estimated time for delivery for each object can be determined as shown at 1804. The estimated time for delivery can then be compared to the time indicator for each object in the object schedule to determine the expected "age" of the object when broadcast. Since the timeliness factor of each object preferably decreases with the "age" of the object, the timeliness factor will be dependent on the position of the object within the schedule. Once the utility factor is calculated for each object, an updated overall schedule utility factor is calculated, as shown at 1806.

It is contemplated that the illustrative algorithms described above may calculate the object utility factors and/or the overall schedule utility factor in accordance with, for example, FIGS. 9–19 above. That is, the calculation of each utility factor may include, for example, selected object description fields that relate to, among other things, the importance, the timeliness, the variety and/or freshness, and/or the lifetime provided by the object. The ordering of objects may then be manipulated to optimize the overall utility factor of the object schedule 400.

Figure 25:
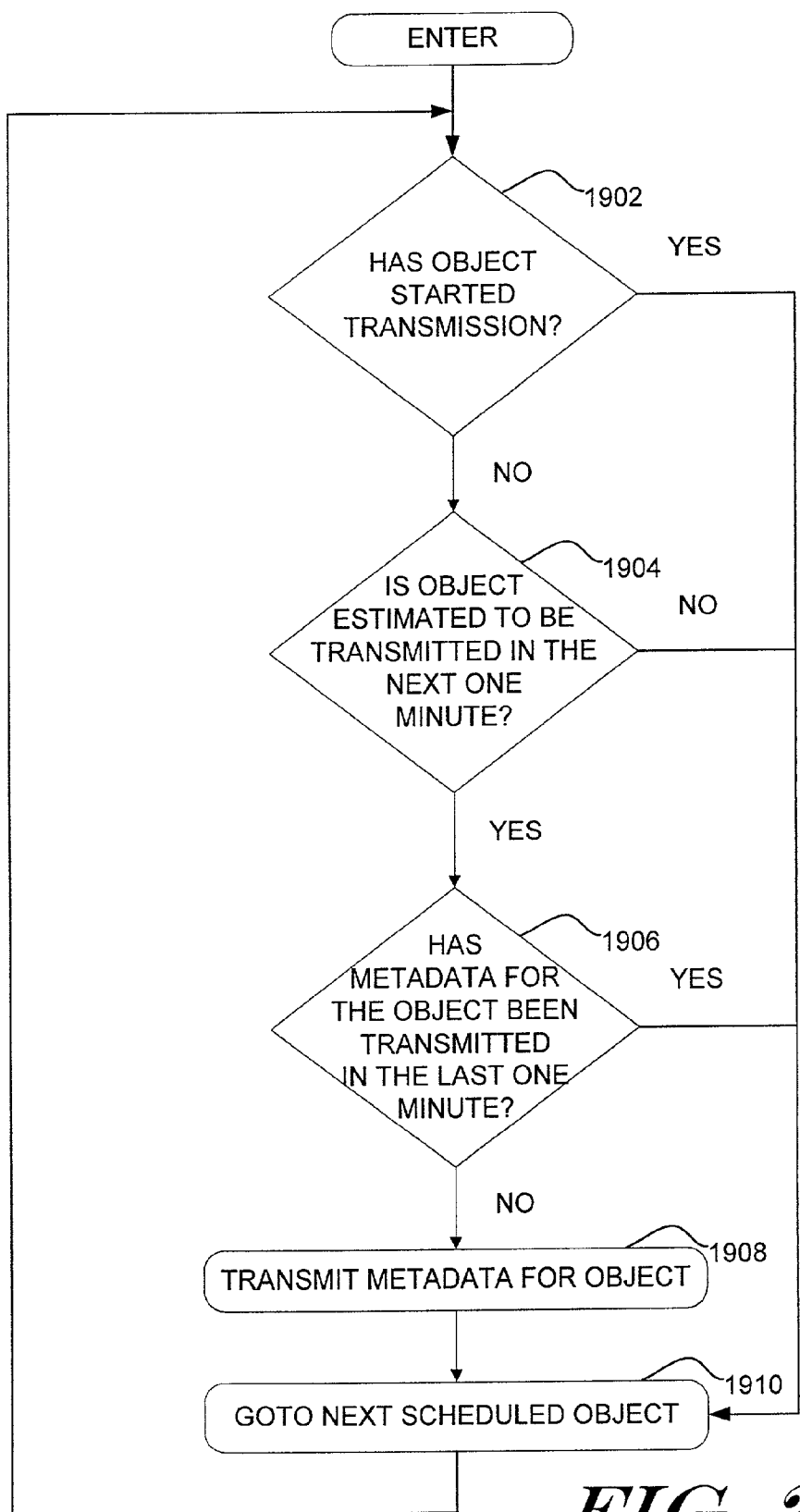
FIG. 25 is a flow diagram showing an illustrative method for scheduling objects so that the object meta-data is sent before the object.

FIG. 25 is a flow diagram showing an illustrative method for scheduling objects so that the object meta-data is sent before the object. In accordance with a preferred embodiment of the present invention, the scheduler block 304 of FIG. 3 provides objects to one or more receiver units. The receiver units cache selected objects, based on user preferences selected by the user. A further discussion of the receiver units can be found in co-pending U.S. patent application Ser. No. 09/571,791, filed May 16, 2000, entitled "Maintaining Information Variety in an Information Receiving System".

Preferably, the receiver units receive the meta-data for each object before the corresponding object arrives. This allows the receiver unit to decide whether the object is to be cached before the object arrives. This helps reduce the amount of resources required in the receiver unit.

To accommodate this, the scheduler block 304 preferably ensures that the meta-data is sent before the corresponding object. Step 1902 determines if a particular object in the object schedule 400 has begun transmission. If it has, control is passed to block 1910, wherein the next object in the schedule is queried. If the object has not begun transmission, step 1904 determines if the object is estimated to be transmitted within the next minute. As indicated above, the estimated time for delivery can be determined by estimating the current channel bandwidth and using the size and position of each object in the object schedule 400.

If it is determined that the object is not going to be transmitted in the next minute, control is passed to step 1910, wherein the next object in the schedule is queried. If, however, it is determined that the object is going to be transmitted in the next minute, control is passed to step 1906. Step 1906 determines whether the meta-data for the object has been transmitted in the last one minute. If the meta-data for the object has been transmitted in the last minute, control is passed to step 1910, wherein the next object in the schedule is queried. If, however, the meta-data for the object has not been transmitted in the last minute, control is passed to step 1908. Step 1908 transmits the meta-data for the object.

Figure 26:
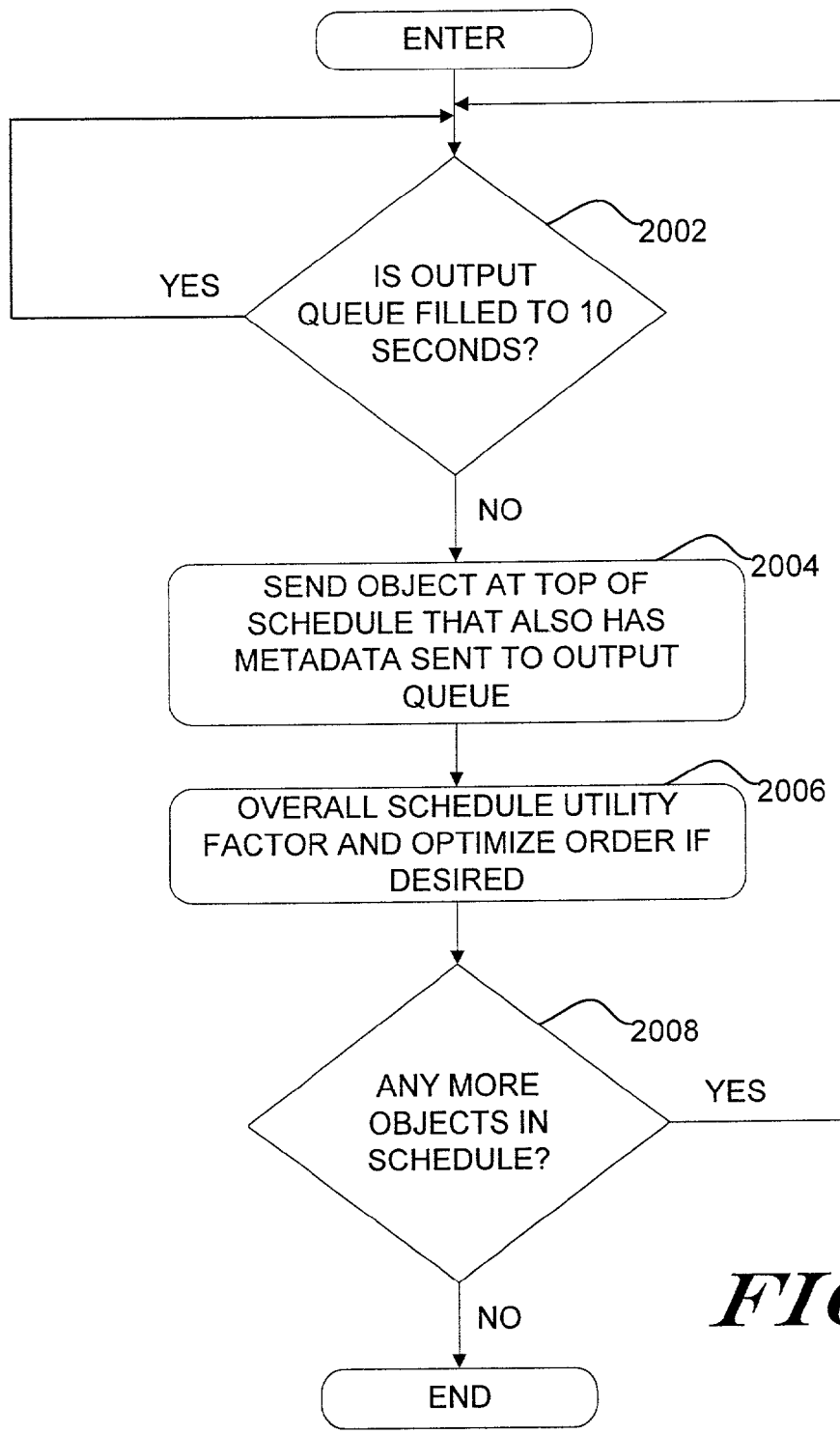
FIG. 26 is a flow diagram showing an illustrative method for scheduling objects to an output queue.

FIG. 26 is a flow diagram showing an illustrative method for scheduling objects to an output queue. As indicated with reference to FIG. 4, the objects at the top of the object schedule 400 are presented to an output queue in the packet scheduler 312. Step 2002 determines if the output queue is filled to provide ten (10) seconds of transmission. Once the output queue is not filled to provide ten (10) seconds of transmission, control is passed to step 2004. Step 2004 sends the object at the top of the schedule that also has its meta-data sent to the output queue. Step 2006 then updates the overall schedule utility factor, and re-optimizes the order of the object in the object schedule if appropriate. The overall schedule utility factor of the object schedule can change because an object has been removed from the object schedule 400 (and another inserted, if appropriate).

Step 2008 determines if there are any more objects in the object schedule. If there are more objects in the object schedule, control is passed back to step 2002. If there are no more objects in the object schedule, the algorithm is exited.

Figure 27A:
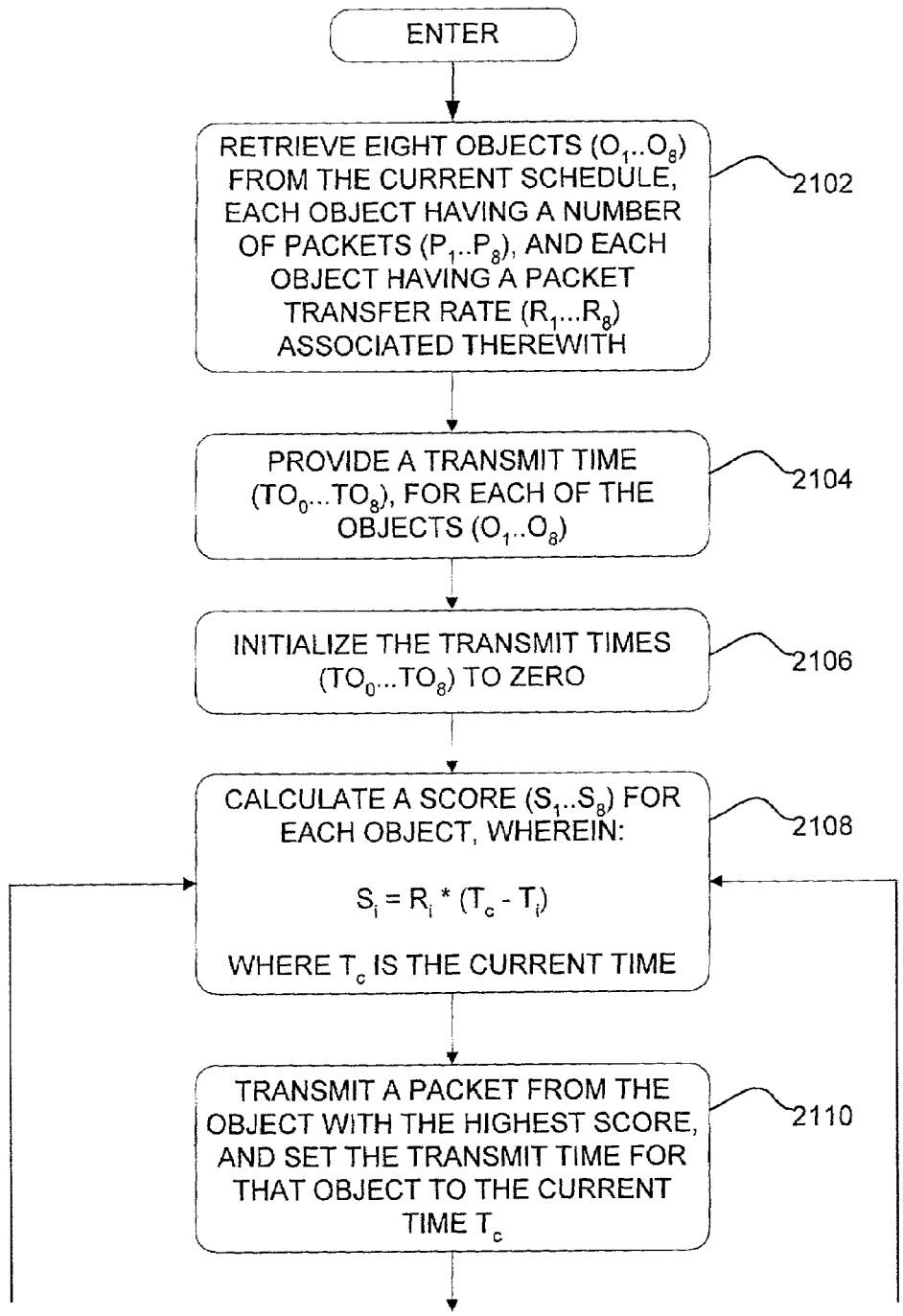
FIGS. 27A–27B show a flow diagram of an illustrative method for scheduling packets from those objects in an output queue.
Figure 27B:
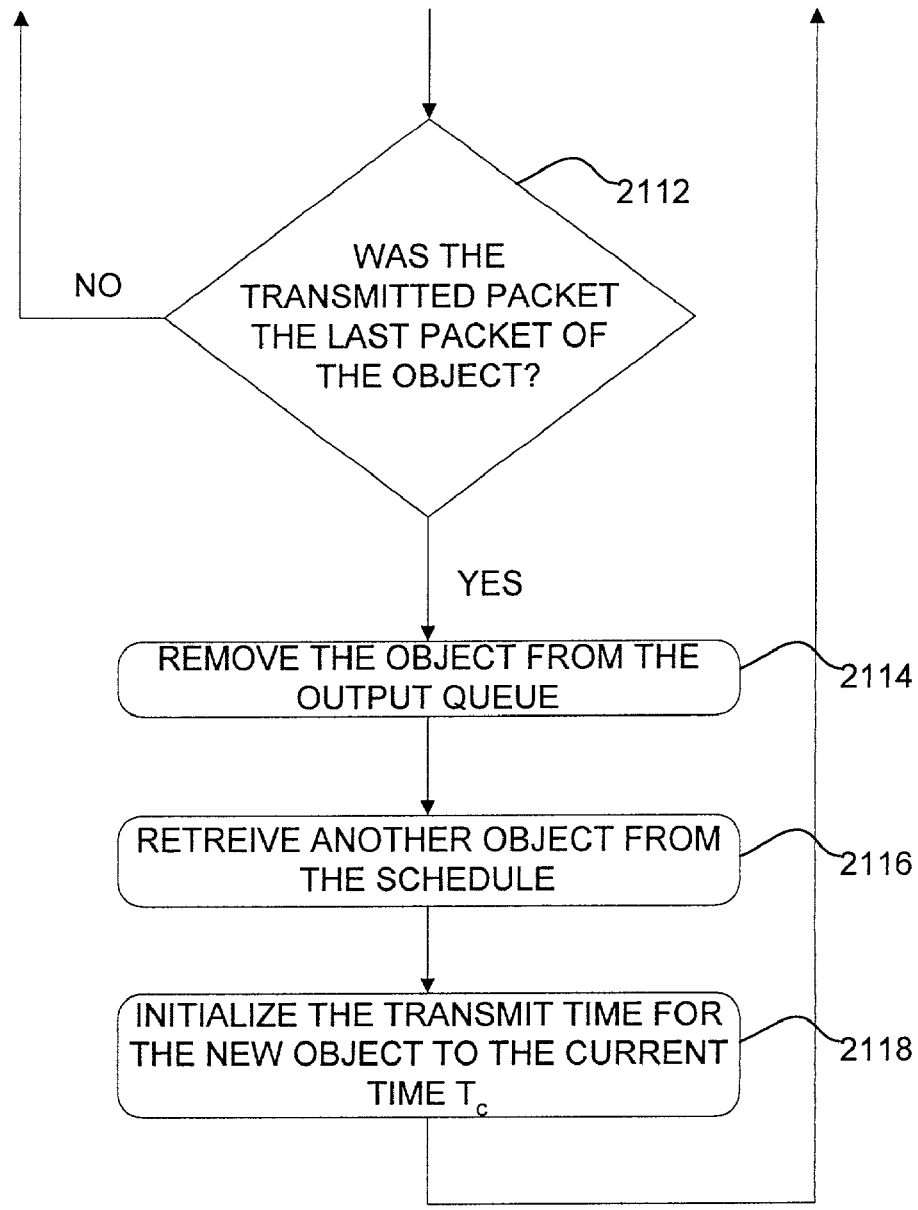

FIGS. 27A–27B show a flow diagram of an illustrative method for scheduling packets from those objects in an output queue. As indicated above, it is often desirable to interleave packets or symbols from several scheduled objects during transmission. One reason for this is that interleaving tends to spread the errors of error bursts in the transmission channel across several objects, which may be more acceptable than having many errors in one object.

Step 2102 retrieves eight objects from the current object schedule. While eight objects are used in the example, it should be recognized that the number of objects may depend on a number of factors including the object transfer rates, the total available bandwidth, the required meta data lead times, etc. Thus, the number of objects in the may vary, but an upper bound may be provided, if desired.

Each object has a number of packets and a desired packet transfer rate. The packet scheduler 312 of FIG. 3 provides a transmit time variable to each of the objects, as shown at 2104. Step 2106 initializes the transmit time variables to zero. Step 2108 then calculates a score of each object. The score is related to the desired transfer rate for the object, and the time since a packet was last transmitted for that object. The time since a packet was last transmitted for an object can be calculated by simply subtracting the transmit time variable for the object from the current time.

Step 2110 transmits a packet from the object with the highest score. Once the packet is transmitted, the transmit time variable for that object is set to the current time. Thus, the score for that object is set to zero, making it more likely that a packet from another object will be selected for transmission next. The transfer rate for each object operates as a weighting function to make those objects with higher transfer rates more likely to have a packet selected for transmission.

Step 2112 determines if the transmitted packet was the last packet of the object. If the transmitted packet was not the last packet, control is passed back to step 2108, wherein a new score is calculated for each object. If the transmitted packet was the last packet of the selected object, control is passed to step 2114. Step 2114 removes the selected object from the output queue. When the bandwidth exceeds the number of object in the output queue, step 2116 retrieves another object from the object schedule. Step 2118 initializes the transmit time parameter for the new object to the current time, wherein control is passed back to step 2108 as shown.

Figure 28A:
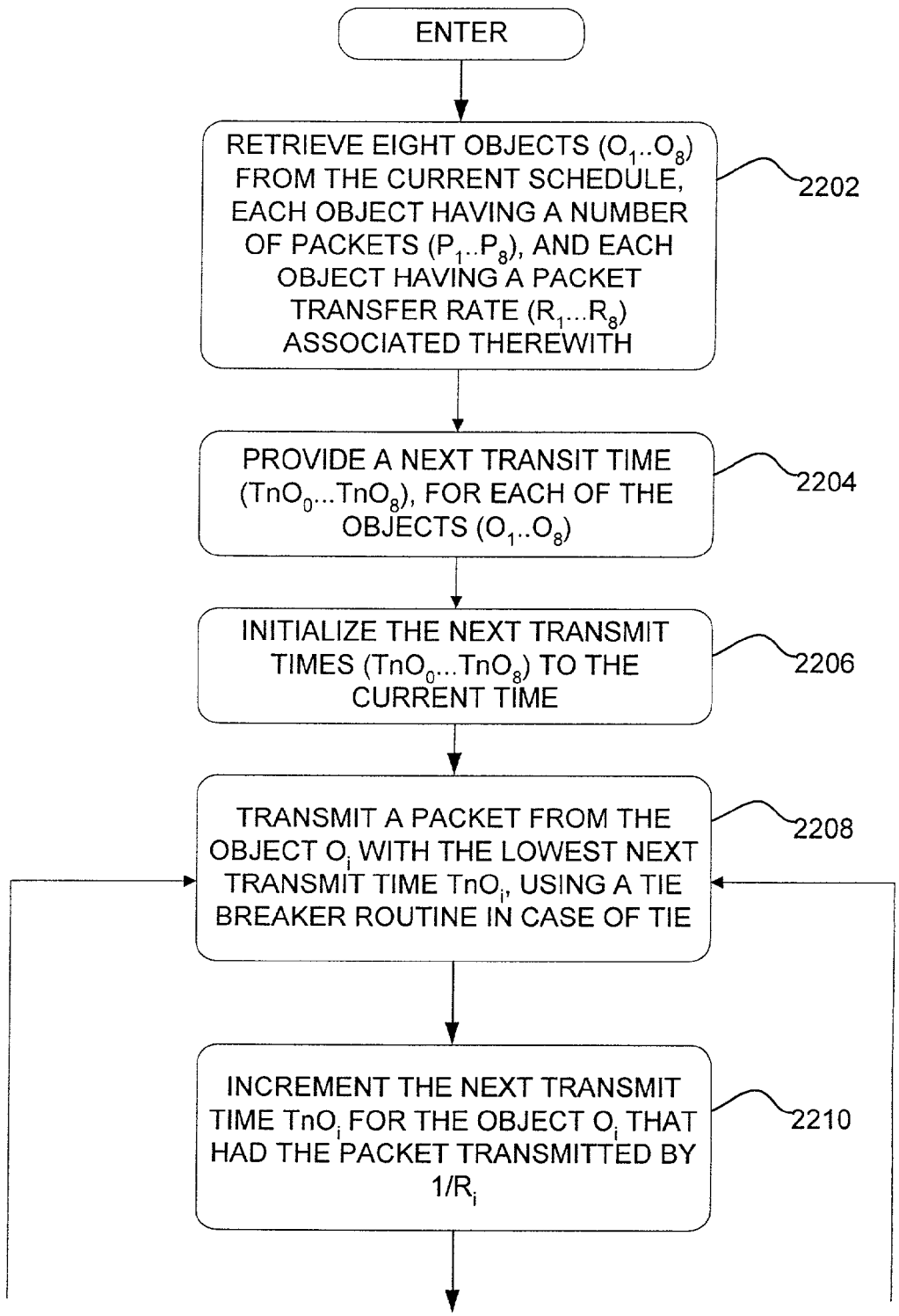
FIGS. 28A–28B show a flow diagram of another illustrative method for scheduling packets from those objects in an output queue.
Figure 28B:
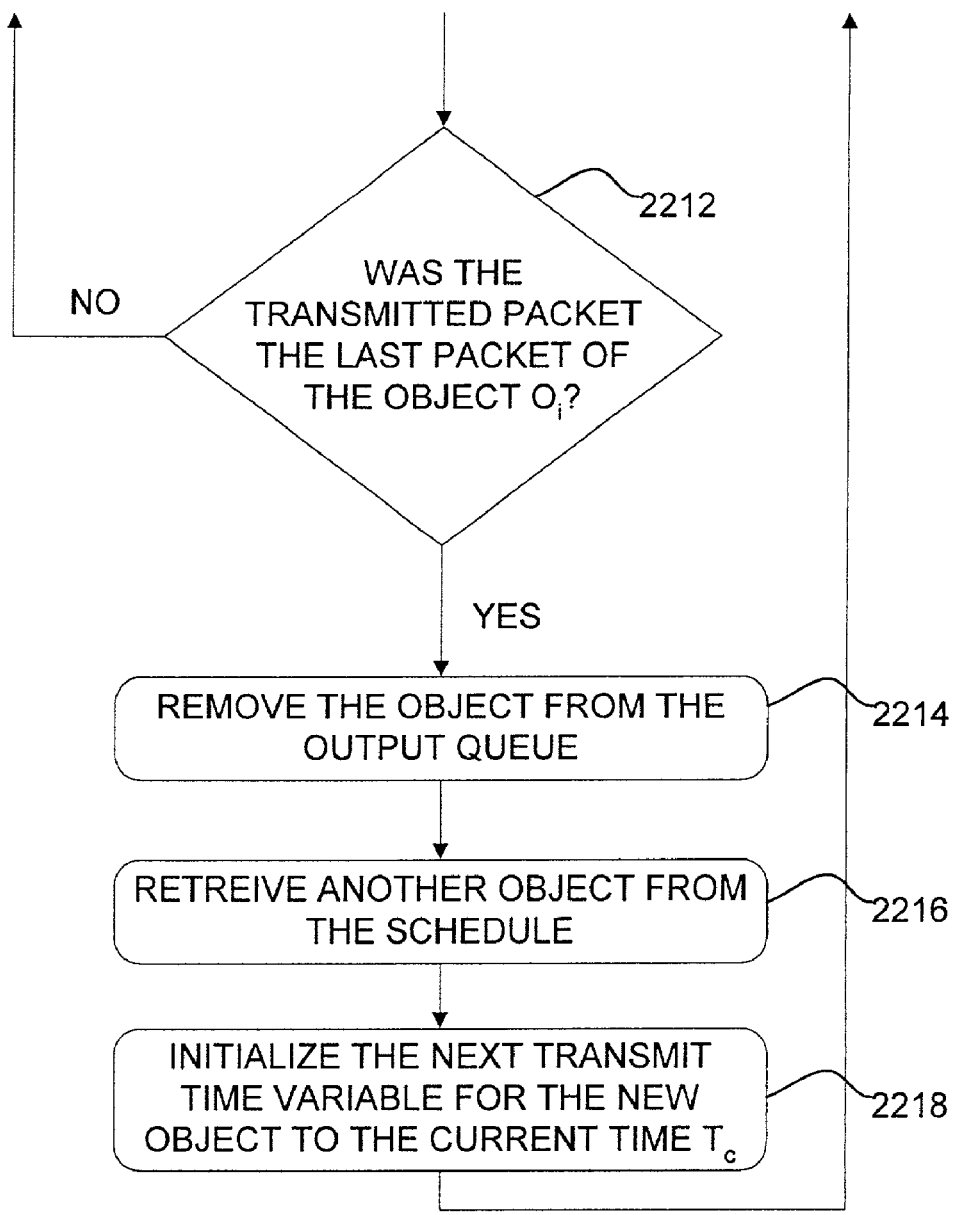

FIGS. 28A–28B show a flow diagram of another illustrative method for scheduling packets from those objects in an output queue. Step 2202 retrieves eight objects from the current object schedule. While eight objects are used in this example, it should be recognized that the number of objects may depend on a number of factors including the object transfer rates, the total available bandwidth, the required meta data lead times, etc. Thus, the number of objects in the may not be fixed. An upper bound on the number of objects may be provided, if desired.

Each object has a number of packets and a desired packet transfer rate. The packet scheduler 312 of FIG. 3 provides a "next transit time" variable to each of the objects, as shown at 2204. Step 2206 initializes all of the next transmit time variables to the current time.

Step 2208 transmits a packet from the object $O_i$ with the lowest next transmit time variable, using a tie breaker routine if necessary. Once the selected packet is transmitted, the next transmit time variable for the object that had the packet transmitted is incremented by a value. Preferably, the next transit time variable is incremented by the inverse of the packet transfer rate of the corresponding object.

Step 2212 determines if the transmitted packet was the last packet of the selected object $O_1$. If the transmitted packet was not the last packet, control is passed back to step 2208, wherein the object with the lowest next transmit time variable is selected, and a packet therefrom is transmitted. If the transmitted packet was the last packet of the selected object $O_1$, control is passed to step 2214. Step 2114 removes the selected object from the output queue.

When the bandwidth exceeds the number of objects in the output queue, step 2216 retrieves another object from the object schedule. Step 2218 initializes the transmit time parameter for the new object to the current time, and control is passed back to step 2208 as shown. This method has the advantage of keeping track of delays that might accumulate due to bandwidth variations, tiebreaker policies, etc.

Having thus described the preferred embodiments of the present invention, those of skill in the art will readily appreciate that the teachings found herein may be applied to yet other embodiments within the scope of the claims hereto attached.

The invention claimed is:

1. A method for delivering objects to one or more receiver units, comprising:
   receiving a number of incoming objects, each object corresponding to one or more classes;
   maintaining objects from a variety of classes in an object schedule, wherein each object has a utility factor, and the value of the utility factor is dependent, at least to some degree, on the position of the object in the object schedule; and
   delivering selected objects from the object schedule to the one or more receiver units based on the position of the object in the object schedule,
   wherein each class has a utility factor that is calculated by combining, via a sub-linear function, the utility factors of those scheduled objects that correspond to the class, and wherein the sub-linear function includes a square-root function.

2. A method according to claim 1, wherein objects from a variety of classes are maintained by determining which of the incoming objects are to be added to the object schedule and which of the cached objects in the object schedule are be evicted, such that objects from a variety of classes are maintained in the object schedule.

3. A method according to claim 1, wherein the object schedule has an overall schedule utility factor, the overall schedule utility factor is calculated by combining via a schedule function the utility factors for each of the classes.

4. A method according to claim 3, wherein the schedule function is a summing function.

5. A method according to claim 3, wherein objects from a variety of classes are maintained in the object schedule by:
   receiving a new object;
   scheduling the new object in an initial position within the object schedule; and
   reordering the scheduled objects so that the overall schedule utility factor is increased.

6. A method according to claim 1, wherein each object in the object schedule has an estimated time for delivery based on the position of the object in the schedule.

7. A method according to claim 6, wherein each object in the schedule has an importance factor.

8. A method according to claim 7, wherein the utility factor for each object is dependent on the estimated time for delivery and the importance factor.

9. A method according to claim 8, wherein the value of the utility factor $Utility_{obj}$ for each object is related to the importance factor of the object times a function f(AGE), where f(AGE) is a predetermined function that decreases with an AGE of the object, the AGE of the object being related to the estimated time for delivery.

10. A method according to claim 9, wherein the value of the utility factor $Utility_{obj}$ for each object Is related to the importance factor of the object times a freshness function R(AGE), where R(AGE) is a predetermined function that decreases with an AGE of the object, the AGE of the object being related to the estimated time for delivery.

11. A method according to claim 1, wherein each object in the schedule is a member of one or more classes, and the utility factor for each object is dependent on a ClassVarietyScore of each of the member classes.

12. A method according to claim 11, wherein the ClassVarietyScore for each class is a measure of the number of member objects of the class that were previously broadcast and/or are scheduled to be broadcast.

13. A method according to claim 12, wherein the contribution of each object to the ClassVarietyScore decreases with time.

14. A method according to claim 13, wherein each class has a class importance factor.

15. A method according to claim 14, wherein the utility factor $Utility_{obj}$ for each object is the sum over all member classes, the class importance factor of each member class times a function g(ClassVarietyScore), where g(ClassVarietyScore) is a predetermined function that decreases with the ClassVarietyScore of the class.

16. A method for scheduling objects for delivery to one or more receiver units, the method comprising:
receiving one or more incoming objects, each having a utility factor;
scheduling the objects for delivery in an initial scheduling order, the value of the utility factor for each of the objects being dependent, at least to some degree, on the position of the object in the schedule;
calculating an overall schedule utility factor for the schedule by combining the utility factors of each of the scheduled objects using a predefined function;
reordering the scheduled objects so that the overall schedule utility factor is increased, wherein reordering the scheduled objects includes:
moving a selected object up one position in the schedule;
calculating an updated overall schedule utility factor;
determining if the updated overall schedule utility factor is greater than the previous overall schedule utility factor; and
retaining the new position of the selected object if the updated overall schedule utility factor is greater than the previous overall schedule utility factor; and
delivering one or more of the objects from the top of the schedule.

17. A method according to claim 16, further comprising:
repeating the moving, calculating, determining, and retaining steps until the updated overall schedule utility factor is not greater than the previous overall schedule utility factor; and
returning the selected object to its previous position when the updated overall schedule utility factor is not greater than the previous overall schedule utility factor.

18. A method according to claim 16, wherein reordering the scheduled objects includes:
moving a selected object to a random position in the schedule;
calculating an updated overall schedule utility factor;
determining if the updated overall schedule utility factor is greater than the previous overall schedule utility factor, and
retaining the new position of the selected object if the updated overall schedule utility factor is greater than the previous overall schedule utility factor.

19. A method according to claim 18, further comprising:
repeating the moving, calculating, determining, and retaining steps until the updated overall schedule utility factor is not greater than the previous overall schedule utility factor; and
returning the selected object to its previous position when the updated overall schedule utility factor is not greater than the previous overall schedule utility factor.

20. A method according to claim 18, further comprising:
selecting another object and moving the selected object to a random position in the schedule;
repeating the moving, calculating, determining, and retaining steps until the updated overall schedule utility factor is not greater than the previous overall schedule utility factor; and
returning the selected object to its previous position when the updated overall schedule utility factor is not greater than the previous overall schedule utility factor.

21. A method according to claim 16, wherein the utility factor of an object is higher than another similarly situated object if the object is more timely.

22. A method according to claim 16, wherein the utility factor of an object increases the overall schedule utility factor more than another similarly situated object if the object provides more variety to the object schedule.

23. A method according to claim 16, wherein each object in the schedule has an estimated time for delivery based on the position of the object in the schedule, and the value of the utility factor for the object is dependent on the estimated time for delivery.

24. A method according to claim 23, wherein the estimated time for delivery of each object is calculated by:
estimating a current channel bandwidth for delivery of the scheduled objects; and
calculate an estimated time for delivery for each object using the size of each scheduled object and the estimated channel bandwidth.

25. A method according to claim 24, wherein each object in the schedule is a member of one or more classes, and the value of the utility factor for each class is dependent on a measure of the objects assigned to the class.

26. A method according to claim 25, wherein the measure of the objects is the number of objects assigned to the class.

27. A method according to claim 25, wherein the measure of the objects is the number of object bytes assigned to the class.

28. A method according to claim 25, wherein the measure of the objects is the sum of the object utility factors assigned to the class.

29. An information delivery system, comprising
a receiver for receiving a stream of incoming objects, each object corresponding to one or more classes;
object schedule for storing a set of the incoming objects, wherein each object has a utility factor, and the value of the utility factor is dependent, at least to some degree, on a position of the object in the object schedule;
object scheduler for determining which of the incoming objects to add to the object schedule and which of the cached objects to evict from the object schedule, such that objects from a variety of classes are maintained in the object store; and
delivery means for delivering selected cached objects from the object schedule to one or more receiver units based on the position of the object in the object schedule,
wherein each class has a utility factor that is calculated by combining, via a sub-linear function, the utility factors of those scheduled objects that correspond to the class, and wherein the sub-linear function includes a square-root function.

30. An information delivery system according to claim 29, wherein the object schedule has an overall schedule utility factor, the overall schedule utility factor is calculated by combining, via a schedule function, the utility factors for each of the classes.

31. An information delivery system according to claim 30, wherein the schedule function is a summing function.

32. A system for scheduling objects for delivery to one or more receiver units, comprising:
a receiver for receiving one or more objects, each object having a utility factor;
an object scheduler for scheduling the objects for delivery in an initial scheduling order, the value of the utility factor for each of the objects being dependent, at least to some degree, on the position of the object in the schedule;
the object scheduler calculating an overall schedule utility factor for the schedule by combining the utility factors of each of the scheduled objects using a predetermined function;
the object scheduler reordering the scheduled objects so that the overall schedule utility factor is increased, wherein reordering the scheduled objects includes:
moving a selected object up one position in the schedule;
calculating an updated overall schedule utility factor;
determining if the updated overall schedule utility factor is greater than the previous overall schedule utility factor; and
retaining the new position of the selected object if the updated overall schedule utility factor is greater than the previous overall schedule utility factor; and
delivery means for delivering one or more of the objects from the top of the schedule to the one or more receiver units.

33. A method for transmitting one or more objects $(O_1, \ldots O_N)$ to one or more receiver units, wherein each object $O_i$ has one or more packets $(P_1, \ldots P_K)$ and a packet transfer rate $R_i$, the method comprising:
initializing a transmit time $(T_1, \ldots T_N)$ for each object to zero;
calculating a score, $S_i$, for each object using the relation $S_i = R_i*(T_c - T_i)$, where $T_c$ is the current time;
transmitting one or more packets from the object with the highest score, $S_i$; and
setting the transmit time $T_i$ for the object with the highest score to the current time $T_c$.

34. A method according to claim 33, further comprising:
determining if the last transmitted packet was the last packet of the object with the highest score; and
removing the object with the highest score if the last transmitted packet was the last packet of the object with the highest score.

35. A method according to claim 4, further comprising returning to the calculating step to calculate a new score, $S_i$, for each object using the relation $S_i = R_i*(T_c - T_i)$.

36. A method for transmitting one or more objects to one or more receiver units, wherein each object has one or more data packets, comprising:
providing a next transmit time variable for each object;
initializing the next transmit time variable for each object to a predetermined value;
selecting the object with the lowest next transmit time variable;
transmitting one or more packets from the selected object; and
incrementing the next transmit time variable for the selected object by an incremental value;
repeating the selecting, transmitting and incrementing steps;
wherein the incremental value is dependent on the transfer rate for the selected object, and wherein the incremental value is l/(the transfer rate) for the selected object.

37. A method according to claim 36, further comprising:
determining if the last transmitted packet was the last packet of the selected object; and
removing the selected object if the last transmitted packet was the last packet of the selected object.

38. A method for delivering objects to one or more receiver units, comprising:
receiving a number of incoming objects, each object corresponding to one or more classes;
maintaining objects from a variety of classes in an object schedule, wherein each object has a utility factor, and the value of the utility factor is dependent, at least to some degree, on the position of the object in the object schedule; and
delivering selected objects from the object schedule to the one or more receiver units based on the position of the object in the object schedule,
wherein each object in the object schedule has an estimated time for delivery based on the position of the object in the schedule, wherein each object in the schedule has an importance factor, wherein the utility factor for each object is dependent on the estimated time for delivery and the importance factor, and wherein the value of the utility factor $Utility_{obj}$ for each object is related to the importance factor of the object times a function f(AGE), where f(AGE) is a predetermined function that decreases with an AGE of the object, the AGE of the object being related to the estimated time for delivery.

39. A method according to claim 38, wherein the value of the utility factor $Utility_{obj}$ for each object is related to the importance factor of the object times a freshness function R(AGE), where R(AGE) is a predetermined function that decreases with an AGE of the object, the AGE of the object being related to the estimated time for delivery.

40. A method for delivering objects to one or more receiver units, comprising:

receiving a number of incoming objects, each object corresponding to one or more classes;

maintaining objects from a variety of classes in an object schedule, wherein each object has a utility factor, and the value of the utility factor is dependent, at least to some degree, on the position of the object in the object schedule; and delivering selected objects from the object schedule to the one or more receiver units based on the position of the object in the object schedule, wherein each object in the schedule is a member of one or more classes, and the utility factor for each object is dependent on a ClassVarietyScore of each of the member classes, the ClassVarietyScore for each class is a measure of the number of member objects of the class that were previously broadcast and/or are scheduled to be broadcast, wherein the contribution of each object to the ClassVarietyScore decreases with time, wherein each class has a class importance factor, and wherein the utility factor $Utility_{obj}$ for each object is the sum over all member classes, the class importance factor of each member class times a function g(ClassVarietyScore), where g(ClassVarietyScore) is a predetermined function that decreases with the ClassVarietyScore of the class.

* * * * *